(12) United States Patent
Swierz, III et al.

(10) Patent No.: US 9,779,386 B2
(45) Date of Patent: Oct. 3, 2017

(54) METHOD AND SYSTEM FOR IMPLEMENTING WORKFLOWS AND MANAGING STAFF AND ENGAGEMENTS

(75) Inventors: N. Frank Swierz, III, Saline, MI (US); Jon Baron, Dexter, MI (US); Brian Vroom, Ann Arbor, MI (US); Mark Powell, Chelsea, MI (US); Randall Loughridge, Pinckney, MI (US); Stephen Perreault, Brooklyn, NY (US); Stephanie Black, Grapevine, TX (US); Todd Denlinger, Leander, TX (US); Kenneth Koskay, Southlake, TX (US); Greg Poirier, Pinckney, MI (US)

(73) Assignee: Thomson Reuters Global Resources, Baar (CH)

( * ) Notice: Subject to any disclaimer, the term of this patent is extended or adjusted under 35 U.S.C. 154(b) by 538 days.

(21) Appl. No.: 13/170,120

(22) Filed: Jun. 27, 2011

(65) Prior Publication Data
US 2012/0215578 A1 Aug. 23, 2012

Related U.S. Application Data

(63) Continuation of application No. 12/837,709, filed on Jul. 16, 2010, which is a continuation-in-part of application No. 12/584,130, filed on Aug. 31, 2009.
(Continued)

(51) Int. Cl.
*G06Q 30/00* (2012.01)
*G06Q 10/10* (2012.01)
*G06Q 50/20* (2012.01)

(52) U.S. Cl.
CPC .......... *G06Q 10/10* (2013.01); *G06Q 50/205* (2013.01)

(58) Field of Classification Search
CPC ...................... G06Q 50/205; G06Q 10/06311
(Continued)

(56) References Cited

U.S. PATENT DOCUMENTS

| 2003/0152904 A1* | 8/2003 | Doty, Jr. | G09B 7/00 434/350 |
| 2003/0154117 A1* | 8/2003 | Willard | 705/8 |

(Continued)

OTHER PUBLICATIONS

Thomson Tax & Accounting: "CPE & Training Solutions from Thomson Tax & Accounting," Internet Archive Wayback Machine, www.archive.org; http://trainingcpe.thomson.com; May, Jul. 2008; 10pgs.*
(Continued)

*Primary Examiner* — Rob Pond
(74) *Attorney, Agent, or Firm* — Duncan Galloway Egan Greenwald, PLLC; Kevin T. Duncan

(57) ABSTRACT

The present invention relates to software and a method of use for implementing workflows and managing engagements and staff. More particularly, the present invention relates to a software module tracking data of staff, engagements and workflows and a method of using such data in the management of staff and assignment of tasks. Information concerning employees is input into a database by the manager and the employees, and is tracked therein. The information concerning an employee includes an employee's availability, ability and experience. Workflow/Task information is input into the database when either a client makes a request for service of the business, or a workflow/task internal to the business is needed to be performed. Task information includes the nature of the work and deadlines. Task information is compared to the employee information. A list is automatically generated naming the employees best suited to the mandate of the task. The manager then chooses
(Continued)

a name from the top of the list and assigns the task to that employee.

24 Claims, 39 Drawing Sheets

Related U.S. Application Data

(60) Provisional application No. 61/398,453, filed on Jun. 25, 2010.

(58) Field of Classification Search
USPC .................................................. 705/26, 27, 7
See application file for complete search history.

(56) References Cited

U.S. PATENT DOCUMENTS

2004/0267595 A1* 12/2004 Woodings et al. ............... 705/9
2005/0125274 A1* 6/2005 Nastacio et al. ................. 705/8
2005/0187802 A1* 8/2005 Koeppel ........................... 705/4
2007/0094121 A1* 4/2007 Dion .................... G06Q 20/102
705/36 R

OTHER PUBLICATIONS

Gold, Liz: "How do you want your CPE?" Accounting Today, v22i1, Jan. 7-28, 2008; ProQuest Dialog #234362341, 5pgs.*
Anonymous: "PPC: The Internet is one Key," Accounting Today, Dec. 2002, ProQuest Dialog #234381477, 3pgs.*
Stimpson, Jeff: Automating Workflow,: The Practical Accountant, v40i10, Oct. 2007,ProQuest Dialog #208252727, 11pgs.*
UU: Knighton et al.: "How Technology Enhances Governance Compliance," Financial Executive, v24i6, Jul.-Aug. 2008, ProQuest Dialog #208892980, 7pgs.*
VV: Schulz, Wayne: "Software That Puts It All Together," Accounting Today, 2006; ProQuest Dialog #234390023, 11pgs.*
WW: Baron, Jon: "Information at Your Fingertips," The Practical Accountant, Jun. 2006, ProQuest Dialog #208251198, 4pgs.*

* cited by examiner

SETUP|FIRM|BENEFITS

Firm

| Main | Contact Info | Preferences | Billing and A/R | Benefits | Terminology | Notifications |

Benefit Year

Benefits are tracked from [January] [1] to [December ▼] [31 ▼]

Holidays

Enter the holidays observed by your <Firm>.

| Description | Occurs | | Date |
|---|---|---|---|
| ▶ New Year's Day | Every January 1 | ... | 01/01/2007 |
| Martin Luther King Day | On the third Monday in January | ... | 01/15/2007 |
| Memorial Day | On the last Monday in May | ... | 05/28/2007 |
| Independence Day | Every July 4 | ... | 07/04/2007 |
| Labor Day | On the first Monday in September | ... | 09/03/2007 |
| Thanksgiving Day | On the fourth Thursday in November | ... | 11/22/2007 |
| Christmas Day | Every December 25 | ... | 12/25/2007 |
| New Year's Day | Every January 1 | ... | 01/01/2008 |
| Martin Luther King Day | On third Monday in January | ... | 01/21/2008 |
| Memorial Day | On the last Monday in May | ... | 05/26/2008 |
| Independence Day | Every July 4 | ... | 07/04/2008 |
| Labor Day | On the first Monday in September | ... | 09/01/2008 |

Comp Time

Allowance Factor: ⦿ [1.00 ▼] hour(s) for every hour worked over expected hours
○ Based on time of year [ ]

☑ Allow annual carryover
　　Maximum allowed: [          ]

[ Enter ] [ Cancel ]

SETUP|STAFF|BENEFITS

Figure 7

ACTIONS|TIME & EXPENSE ENTRY|ENTRY TAB

Figure 8

ACTIONS|TIME & EXPENSE ENTRY|OVERVIEW TAB

Figure 9

ACTIONS|TIME & EXPENSE ENTRY|REVIEW TAB

SETUP|STAFF|TARGETS TAB

SETUP|<STAFF>SKILL AREAS

Figure 14

SETUP|<STAFF>SKILL RATINGS

Figure 15

SETUP|STAFF|SKILL SET TAB

Figure 16

SCHEDULING|AUTO ASSIGN OPTION DIALOG

SCHEDULING|BENEFIT SCHEDULE ITEM DIALOG

Figure 21

SCHEDULING|PROJECTS|TASK DIALOG

CPE Subject Requirements

| Description |
|---|
| Accounting / Auditing |
| Behavioral Courses |
| Ethics / Professional Conduct |
| Taxation |
| Business Law |
| Management Advisory Services |
| Government Auditing |
| Financial Planning |
| Consulting |
| Computer and Information Technology |
| Specialized Industries |

Identification

Description: Taxation

[Add] [Edit] [Delete]   [Enter] [Cancel]

Figure 29

CPE Delivery Methods

| Description |
|---|
| Audio / Videotape |
| Classroom Instruction |
| In-House Education |
| Luncheon / Dinner Speeches |
| Presentations |
| Self-Study |
| Teaching |
| University / College Credit |
| Writing |

Identification

Description: Classroom Instruction

[Add] [Edit] [Delete]   [Enter] [Cancel]

Figure 30

CPE Sponsors

| Description |
|---|
| Thomson RIA |
| TTA Professional Software & Servi... |
| Thomson University, Thomson Cor... |
| Thomson West |
| Practitioners Publishing Company |

Identification

Description: Thomson West

[Add] [Edit] [Delete]   [Enter] [Cancel]

CPE Credit

Identification
- Description: Strategies for Partnerships
- Subject: Taxation
- Delivery Method: Course

CPE Information
- CPE Board: Michigan Board of Public Accounta
- Sponsor: RIA Checkpoint
- Instructor: Mr. Cheat'em

Attendee(s): Loughridge, Randy; Powell, Mark

Show Staff Availability as: Out of office

Dates
- Start time: 03/10/08  8:00:00 AM
- End time: 03/10/08  11:00:00 AM
- Hours: 3.00
- Hours Earned: 2.00
- Cost: $100.00
- ☐ Completed

Notes

Time Entry Information
- ☑ Log time to sheet date: 02/06/08
- Client: Firm Admin
- Engagement: Training
- Activity: CPE

[ OK ]  [ Cancel ]

| Schedule | □|□|× |
|---|---|
| Wednesday - Apr 22, 2009 | 10.50 hours |
| 1:30 PM - 2:00 PM | Fw: Practice CS and the New ARNE Community |
| 3:00 PM - 3:30 PM | Individual Status Meeting |
| | Another test |
| ▲ (Past Start Date) | Organize Team Lunch |
| (Past Due Date) | Call Tom |
| (Past Due Date) | Individual Tax Return |
| (Past Complete Date) | OneTimer |
| (Past Due Date) | Past Start Date |
| (Past Due Date) | Phone Call Exception |
| (Past Due Date) | To Do on today |
| Thursday - Apr 23, 2009 | 7.00 hours |
| 9:00 AM - 10:00 AM | Discussion/Learning/Brainstorming Meeting |
| All day event | Complete User Bulletin |
| Friday - Apr 24, 2009 | 8.00 hours |
| 8:00 AM - 8:00 AM | Pay Day |
| All day event | Set out of office |

Figure 37

| Type | Description | Assigned | Tracking/Status | Priority | Start | Complete | Client |
|---|---|---|---|---|---|---|---|
| | Monthly Writeup | Goodman, Catheri | Not Started | Normal | | 02/23/2009 | Aristocats Repo Service |
| | Client Conference | Goodman, Catheri | Not Started | Normal | 12/31/2008 | 03/31/2009 | Hanna, Jason |
| | Preparation | Goodman, Catheri | Not Started | Normal | 12/31/2008 | 03/31/2009 | Hanna, Jason |
| | Confirm for Lunch and Le | Goodman, Catheri | Scheduled | Normal | 04/01/2009 | 04/01/2009 | Aladin's Lamp Factory |
| | Lunch and Learn | Goodman, Catheri | Not Started | Normal | 04/24/2009 | 04/24/2009 | Aladin's Lamp Factory |
| | Vacation | Goodman, Catheri | Requested | Normal | 04/27/2009 | 04/28/2009 | |
| | Holiday Meetnig | Goodman, Catheri | Scheduled | Normal | 12/24/2009 | 12/24/2009 | Aladin's Lamp Factory |
| | Vacation | Goodman, Catheri | Requested | Normal | 12/25/2009 | 12/25/2009 | |

Assign Next in Work Queue

Figure 38

| Type | Description | Client | Priority | Hours | Start | Complete |
|---|---|---|---|---|---|---|
| | Monthly Writeup | Aladin's Lamp Factor | Normal | 2.00 | | 02/23/2009 |
| | Review | Aladin's Lamp Factor | Normal | 1.00 | | 02/28/2009 |
| | Individual Tax Return | Hanna, Jason | Normal | 1.75 | 12/31/2008 | 03/31/2009 |

Assign Selected to Me

Figure 39

| Scheduled Benefit Requests | | | | |
|---|---|---|---|---|
| Staff | Benefit | Start | End | Hours |
| Goodman, Cather | Vacation | 4/27/2009 12:00 AM | 4/28/2009 12:00 AM | 16.00 |
| Hackney, William | Vacation | 12/25/2009 12:00 AM | 12/25/2009 12:00 AM | 8.00 |

| ID | Sort | Benefit | Beginning Balance | Earned YTD | Used YTD | Balance YTD | Accrues | Absence | Carryover Maximum | Remaining Accrual |
|---|---|---|---|---|---|---|---|---|---|---|
| CAG | Goodman, Catherine | Comp Time | 0.00 | 1.75 | 0.00 | 1.75 | | 0.00 | 40.00 | |
| CAG | Goodman, Catherine | Sick Time | 0.00 | 40.00 | 0.00 | 40.00 | 40.00; Accrues every January 1 | 0.00 | 40.00 | 0.00 |
| WCH | Hackney, William | Comp Time | 0.00 | 0.00 | 0.00 | 0.00 | | 0.00 | 40.00 | 11 |
| WCH | Hackney, William | Vacation | 0.00 | 44.00 | 0.00 | 0.00 | 0.00; Accrues on day 1 of every 1 month(s) | 14.00 | 0.00 | |
| WCH | Hackney, William | Sick Time | 0.00 | 40.00 | 0.00 | 0.00 | 0.00; Accrues every January 1 | 40.00 | 0.00 | 20 |
|  |  |  | 0.00 | 85.75 | 0.00 | 85.75 |  | 105.00 |  |  |

Benefit: CAG - Vacation

| Sheet Date | Date | Description | Hours | Earned | Balance | Comments |
|---|---|---|---|---|---|---|
| 01/01/2009 | | Beginning Balance | 0.00 | 0.00 | 0.00 | |
| 01/01/2009 | 01/01/2009 | Earned | 0.00 | 11.00 | 11.00 | |
| 01/04/2009 | 01/04/2009 | Used | -8.00 | 8.00 | 3.00 | Vacation Day |
| 02/01/2009 | 02/01/2009 | Earned | 11.00 | 11.00 | 14.00 | |
| 03/01/2009 | 03/01/2009 | Earned | 11.00 | 11.00 | 25.00 | |
| 04/01/2009 | 04/01/2009 | Earned | 11.00 | 11.00 | 36.00 | |

| Benefit | Beg Bal | Earned YTD | Used YTD | Balance | Remaining Accruals | Carryover Max | To Use |
|---|---|---|---|---|---|---|---|
| Comp Time | 0.00 | 1.75 | 0.00 | 1.75 | 0.00 | 40.00 | 0.00 |
| Vacation | 0.00 | 44.00 | 8.00 | 36.00 | 88.00 | 40.00 | 84.00 |
| Sick Time | 0.00 | 40.00 | 0.00 | 40.00 | 0.00 | 0.00 | 40.00 |
| | 0.00 | 85.75 | 8.00 | 77.75 | 88.00 | 80.00 | 124.00 |

Figure 49

METHOD AND SYSTEM FOR IMPLEMENTING WORKFLOWS AND MANAGING STAFF AND ENGAGEMENTS

RELATED APPLICATIONS

The present application claims benefit of priority as a continuation-in-part of U.S. application Ser. No. 12/837,709, filed Jul. 16, 2010, entitled "Method and System for Integrated Professional Continuing Education Related Services," which claims benefit of priority as a continuation-in-part of U.S. application Ser. No. 12/584,130, filed Aug. 31, 2009, entitled "Method and System for Integrated Professional Continuing Education Related Services," and also claims priority to U.S. Provisional Application Ser. No. 61/398,453, entitled "Method and System for Implementing Workflows and Managing Staff and Engagements," filed on Jun. 25, 2010, all of which applications are incorporated herein by reference in their entirety.

FIELD OF THE INVENTION

The present invention relates to methods and systems, including software or computer based systems, for more efficiently utilizing professional resources by implementing workflows and managing staff and professional engagements. More particularly, the present invention relates to a software module or application for processing staff and engagement related data for use in tracking availability, expertise, experience, performance and other staff criteria and engagement related data and for managing staffing decisions.

BACKGROUND OF THE INVENTION

Efficient use and management of resources, including professionals and support staff, and engagements, especially in large organizations such as professional services entities, like accounting firms and law firms, is a critical function to the effective and efficient delivery of services and work product. Adequate tracking of performance, expertise, credential, experience, qualification, client or task familiarity, and other work related information is a longstanding need. Products for tracking discrete aspects of employee and engagement information, such as time management systems that track billing information, are well known but provide limited functionality. More comprehensive practice management solutions, such as The Thomson Corporation's ("Thomson") CS Professional Suite of products, including its Practice CS™, solutions.

SUMMARY OF THE INVENTION

One goal of the present invention is to help users schedule their staff, preferably by giving them relevant information to choose the best individual or set of individuals (team) for the task at hand, e.g., professional services engagement. The scheduling aspect schedules staff by using objective criteria such as availability, staff/client/engagement location, skill sets, current staff level, etc. The invention goes further by using analysis to give the scheduler relevant information based on historical numbers, such as realization percentages, budget vs. actual, etc. And then the next step is to use subjective data based on performance evaluations of the staff to help them select the appropriate staff person for the specific task at hand. By utilizing analytic & subject criteria to automatically schedule staff the invention solves a long felt yet unmet need.

The present invention addresses the shortcomings of the prior art and provides, among other things, a Practice Management System (PMS) including a Staff workflow and management System (SWM) module or application and method of use for managing staff members and engagements. The SWM is directed to providing firms and users with tools to track and efficiently manage staff resources, including giving users the ability to create staff schedules, identify conflicts, incorporate performance and education requirements, incorporate benefits information and other information to more intelligently assign staff members to engagements, tasks and projects. SWM provides an enhanced management tool for users, such as partners, supervisors, HR personnel, project managers, and others, to more effectively and efficiently utilize staff resources, track performance, benefits, education and credentials. Staff schedules may consist of work hours, scheduled work hours, time off, continuing education (CE) training, and other items. SWM may be used to schedule and enable firm management to more effectively and efficiently allocate staff resources, schedule and track CE requirements, track staff performance, manage staff and engagements and to generally operate more smoothly. Exemplary organizations that are expected to use SWM include firms providing products and services in the areas of accountancy, audit, tax, finance, law, insurance and consultancy. However, the tools of the present invention may be used in many environments and the invention is not limited to the professional groups discussed herein.

The Staff and Workflow Management System (SWM) is directed to providing firms and users with tools to track and efficiently manage staff resources, including giving users the ability to create workflows and engagement and professional and staff scheduling and learning/training enhancements. Schedules may consist of work hours, scheduled work hours, time off, continuing education (CE) training, and other items. Aspects of workflow management and professional learning within an overarching professional services software-driven system are described in U.S. Ser. No. U.S. Ser. No. 12/584,130, which is hereby incorporated by reference. SWM may be used to schedule and enable firm management to more effectively and efficiently allocate staff resources, schedule and track CE requirements, track staff performance, manage staff and engagements and to generally operate more smoothly. Exemplary organizations that are expected to use SWM include firms providing products and services in the areas of accountancy, finance, law, insurance and consultancy. However, the tools of the present invention may be used in many environments and the invention is not limited to the professional groups discussed herein.

In the field of staff and engagement management, the prior art fails to account for factors other than availability related to accomplishing tasks and assignment of projects. The goal of staff workflow and management is that the person most capable of doing a job is the person performing that task. In carrying out this goal, the staff member must be available to do the work, but must also have the capacity and capability to do the work. The prior art fails to address issues such as professional credentials, capabilities, past experience, industry experience, usefulness to staff projects, office practice group, peer reviews, billing rate, seniority, skill development criteria, client history, distribution of workload, or location of work when facilitating the selection of a staff member for a particular task.

The present invention comprises a software application, a database, and a plurality of computers. The present invention is intended to be used in the assignment of tasks to an employee. These tasks include responsibilities mandated by clients as well as wholly internal responsibilities. Managers or other responsible staff may enter certain information into a database through their computers concerning individual employees such as their professional credentials, capabilities, past experience, industry experience, expertise, usefulness to staff projects, office practice group, peer reviews, billing rate, seniority, skill development criteria, etc. Managers or other responsible staff may update the database anytime such relevant information is received or collected. Employees enter information into the database from their computer concerning their own availability, past experience, credentials, capabilities, etc. Also, this information may be added to the database by other sources or applications, including by integrating the SWM with other systems, such as LDAP type systems. The information in the database is capable of being processed and synthesized by the software application into useful information that may be accessed by users of the SWM in performing work related functions, e.g., users may use the system to incorporate data from the database in work product, such as a report or other document. The manager or other responsible person can then review the work product generated by the application software and database to review the workload of the employees.

Task information can come at the mandate of clients or the manager. When a client makes a request for accounting services, certain information is gathered from the client by the manager such as the name of the client, nature of the work, complexity of the work, the volume of the work, applicable deadlines, conflicts of interest, ability to pay, the industry, whether the industry is heavily regulated, etc. The manager will then take the information gathered from the client along with any other relevant information such as the types of forms that must be used and enter it into the database. Alternatively, the manager may provide information based on wholly internal operations. The software application can then take the information entered into the database concerning the employees and the information concerning the client's needs or of the business's internal needs (collectively the task information). The manager can then use the software application to generate a report listing in order a subset of individuals from the list of total employees to whom the assignment should be made. The goal of the software application is to ensure the best fit between the needs mandated by the task and the employee's ability. The manager then chooses from the list of individuals in the report the employee to whom the task is to be assigned.

The software application uses a logic that includes matching an employee's capability with the needs mandated by the task. Initially, a sub-list is created eliminating unavailable employees or those that do not fit or match certain criteria or screening parameters related to the employee, engagement or task, for example. Employees may not be available for reasons including scheduled vacation time, scheduled continuing education courses, meetings, projects, or other tasks. A second sub-list is created by comparing the client's information such as the complexity of the work, the regulation of the industry, applicable deadlines, amount of work, etc with the available employee's information such as past experience, industrial experience, professional credentials, expertise, office practice groups, etc. Finally, the client's ability to pay, complexity of the work and the nature of the work are compared with the individual's ability, usefulness, capabilities, seniority, and skill development needed. The software application compiles the remaining names and creates a final list of available and qualified individuals best suited to the needs mandated by the task.

In one embodiment, the invention provides a method for determining one or more of workflows, staffing, learning, e.g., CPE (Continuing Professional Education) courses, decisions, such as in providing an accounting service. The method comprises automatically tracking work related data other than availability for each of a set of individuals; (assigning a task to an accounting professional or populating an accounting professional's schedule based upon the work related data—schedule is work or CPE) receiving a request for accounting services; based at least in part on the work related data other than availability, recommending a subset of individuals from the set of individuals to satisfy the request for accounting services. The invention may further comprise determining whether one or more of the recommended subset of individuals is available to satisfy the request for accounting services. The method may further comprise staffing a work function or engagement as a result of the recommending step with at least some of the identified subset of individuals. The work related data of the method may include one or more of a peer review component, availability, billing rate, experience, seniority, industry experience, worker qualifications, skill development criteria, client history, distribution of workload, location of work. The peer review (which may be for example either internal or external or both) component includes evaluating one or more of quality of work, efficiency, expertise, and other attributes.

The Staff Workflow and Management (SWM) aspect of the present invention enables users to quickly and easily manage and track staff benefits, staff budgeting and targets, and staff scheduling. Firms can track comp time, accruable benefits, and holidays for staff, set target work hours and billable amounts for each staff member, schedule staff for various projects, provide real-time schedules, and more. For instance, the SWM includes the following benefits. Maintain staff benefits automatically with program-generated accruals, automated balance reductions via time entry, and automatic adjustments for annual carryover rules. Track accruable benefits, comp time, and observed firm holidays. Set accrual allowances to be fixed based on months of employment, or based on staff levels. Allow comp-time accumulations to be based on earning factors that can be set to fluctuate based on the time of year. Provide staff with benefit balances, projected accruals, and "to use" hours based on carryover rules directly from the Staff Dashboard. Enable supervisors to view time-off requests and approve or deny them directly through the Scheduled Benefit Requests portlet. View accrual and used history in detail on the Benefits tab of the Manage Staff screen. Set and monitor staff performance. Set up per-staff targets including weekly work hours, billable hours, and billable amounts, in as much detail as your firm requires. View targets versus actual results on the Targets tab of the Manage Staff screen. Use the grouping feature of this screen to also view targets by office, department, or supervisor. Flexible view options allow you to see detail all the way down to a daily view. Monitor actual staff performance against their targets using the Staff Targets portlet on the Firm Dashboard. Allow staff to see how they are performing relative to their target billable hours and target work hours using the Time Recap portlet on the Staff Dashboard. Track CPE related information for your firm and staff such as course sponsors and course information. Associate CPE courses with activity codes that allow for entry of CPE information during time entry. Access CPE reports that allow you to keep track of your staff's ongoing learning progress.

The SWM simplifies scheduling and enhances staff utilization. For instance, this feature allows firms to: manage and schedule staff assignments, such as: scheduled phone calls, benefits, meetings, and to-do items. Firms licensed for Project Management and Staff Management will also benefit from project and task scheduling; define staff qualifications for schedule items and work queues. Staff can view only the items for which they are qualified, and they can request additional work from the queue; use the Schedules tab of the Manage Staff screen to view staff workloads and quickly re-assign schedule items for overbooked staff or assign schedule items to staff that have capacity, view items that have not yet been assigned, and identify items that are behind schedule; enable staff to view their schedules, workloads and items in the work queue by using the Schedule, Schedule Items, and Work Queue portlets on the Staff Dashboard; and set reminders for all schedule items, including projects and task using the Project Management and Staff Management modules.

In a first embodiment the present invention provides a method for determining staffing decisions in providing professional services, the method comprising: storing at a database a set of work related data, the set of work related data including skill data, availability data, and client data; automatically tracking work related data, other than availability data, for a plurality of individuals; based at least in part on work related data other than availability data, assigning a task to a set of individuals, the task associated with delivery of professional services.

In a second embodiment the present invention provides a computer-based system for determining staffing decisions in providing professional services, the system comprising: a processor adapted to executed instructions; a memory adapted to store instructions for execution by the processor; a database for receiving and storing work related data, the work related data including skill data, availability data, and client data; a practice workflow and management software application for processing a set of work related data when executed by the processor, and adapted to: automatically track work related data, other than availability data, for a plurality of individuals; based at least in part on work related data other than availability data, assign a task to a set of individuals, the task associated with delivery of professional services.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIGS. 5 through 52 show exemplary screen shots of various embodiments, user interfaces, and features of the present invention.

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
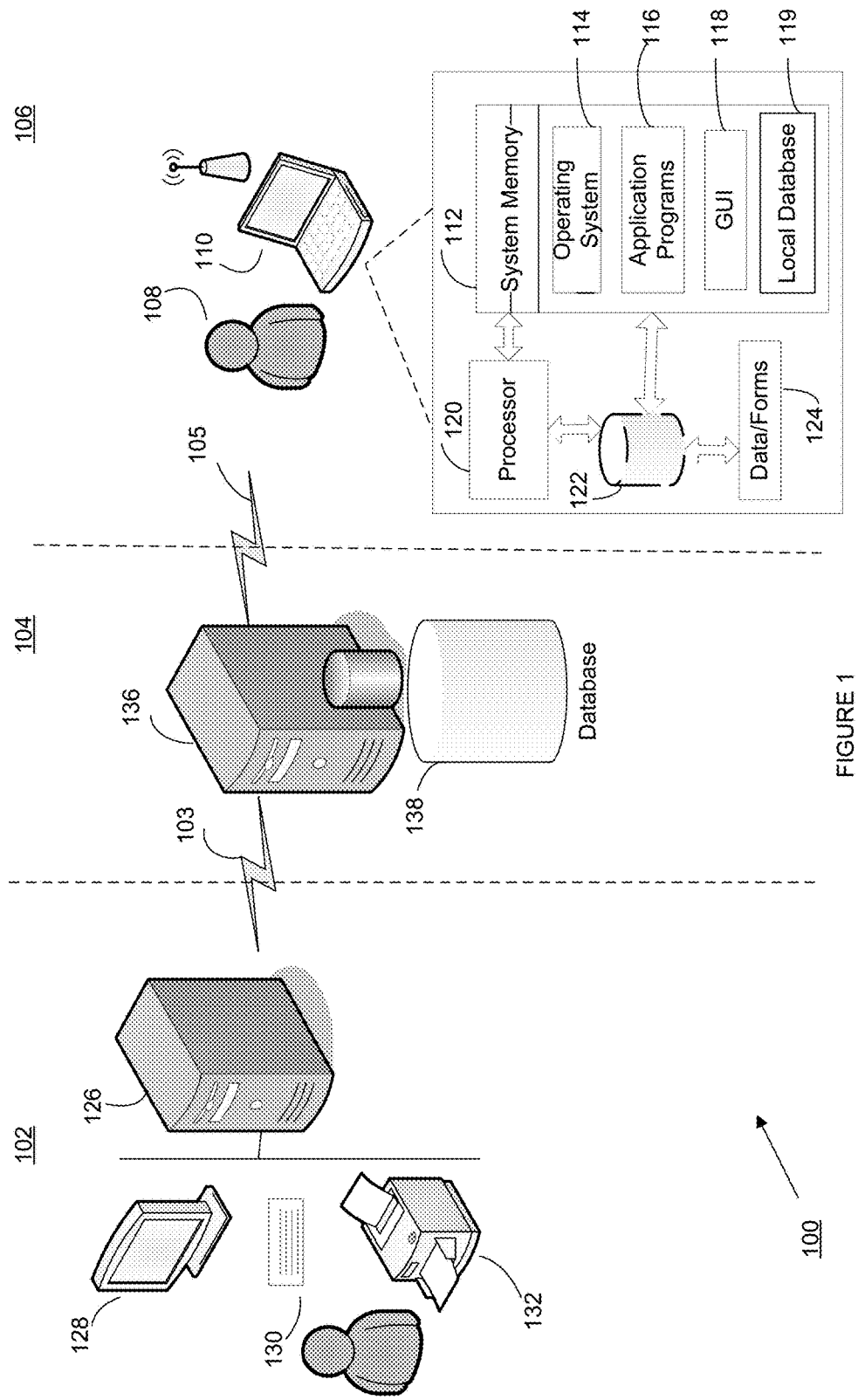
FIG. 1 is a schematic representation of an exemplary embodiment of a computer network including a central server computer executing the Staff Workflow and Management Module (SWM) and being connected to a plurality of client systems for performing staff workflow and management functions in accordance with the present invention.

Referring now to FIG. 1, a client/server architecture system 100 is shown for implementing one embodiment of the staff workflow and management functions of the present invention by an effective bi-directional flow of staff and engagement related data and records to/from client systems 102 and 106 from centralized server 104, which may be co-located with some or all of the clients or remotely located from some or all of the client systems. In one embodiment, the centralized server 104 includes a central server 136, which executes a practice management software application (PMS) that includes a staff workflow and management module (SWM) adapted to read/write staffing and engagement related data and records to the database 138. The PMS may be specifically directed to use in a particular industry or profession, e.g., accounting and auditing. An example of a commercially available PMS is Thomson Reuters Corporation's PracticeCS suite. The PMS is preferably browser-based and may include one or more application programs, example of which include client-side cookie, routine or applet, 116, available to or stored on the computer 110 at client 106, for example. The PMS or its components, e.g., SWM, preferably use a GUI to provide an effective means for users of the system to enter and access data and to perform functions using the system. The PMS includes workflow routines that may be called upon by PMS components, e.g., SWM, for creating, monitoring, editing, and managing workflows associated with the business, e.g., in establishing staffing workflows associated with establishing, performing, completing and reporting professional engagement related functions.

The client systems 102 and 106 may be physically co-located or may be in whole or in part remotely located. In this example, a user 108, such as a professional involved in a professional engagement, e.g., financial audit, may access the PMS operating at the central server 136 so as to receive data, staffing information, engagement and workflow related instructions, updates, documents, etc., including data and forms stored at database 138. The users 102 and 106 communicate via links 103 and 105 with the central server system 104. This configuration is one of many and is not limiting as to the invention. Also, client 106 may use self-contained applications within a desktop or server or network environment and may utilize a local database 119, such as SQL 2005 or above or SQL Express or other suitable database, to store client data and records, which may then be uploaded to database 138 via communication link 105 or shared with users of the PMS via email or the like. Any of several suitable communication links are available, such as one or a combination of wireless, LAN, WLAN, ISDN, X.25, DSL, and ATM type networks, for example. Communications link may be secure such as by using encryption techniques. The client system computers may comprise a typical combination of hardware and software including, as shown in respect to computer 110, system memory 112, operating system 114, application programs 116, graphical user interface (GUI) 118, processor 120, and storage 122 which may contain electronic information 124 such as data records, transactions, data, procedures and the like. The operating system 114 should be suitable for use with the PMS and browser functionality described herein, for example, Microsoft Windows Vista (business, enterprise and ultimate editions), or Windows XP Professional with SP2. Also, the PMS and associated software may include custom integration with Adobe Acrobat applications, scanning software, and Microsoft Office applications, e.g., Outlook, Word and Excel. Application programs 116 may include, for example, Adobe Acrobat, Microsoft Office 2007, Office XP, or Office 2003. The system requirements in one embodiment may require the client machines to be compatible with minimum threshold levels of processing capabilities, e.g., Intel Pentium III, speed, e.g., 500 MHz, and other parameters.

For purposes of discussion, an exemplary client system 102 may comprise a computer 126, user interface peripherals such as drives (not shown), monitor 128, keyboard 130, and printer 132. The client system computer and database 126 may be used to communicate via link 103, e.g., a local area network, Wide Area Network, Wireless LAN, Ethernet, or the Internet, with the PMS central server system 104 and may load, pass, receive information, instructions, such as software executable on the machine 126 and data, forms, procedures and the like for storing and using locally by a user. Communication link 103 may be established between the client system 102 and the central server system 104 for updating data and software used by the user during execution of business processes.

The client system 102 may include a network of computers, such as over a LAN, WLAN, Ethernet, token ring, FDDI ring or other communications network infrastructure. Client system 106 may be included within the network of client system 102 and may represent a remote client, such as a wirelessly connected notebook computer, mobile device or the like, for use at remote locations. For example, client system 106 may represent a computing device used by a professional, such as a financial auditor or accountant, at a client location such as for use in conducting a financial audit. The client facility 102 may also include a database or other data storage component. Aspects of the system 100 may be enabled using any combination of Internet or (World Wide) WEB-based, desktop-based, or application WEB-enabled.

The PMS, for example, may be directed to professionals, including accounting professionals, and may be used to handle professional service provider firm's individual workflow processes. PMS may provide users with real-time functionality that includes current views and perspectives on staff workflow, client status, and/or firm information, such as through a GUI. The PMS may include one or more of: digital dashboards (used to manage day-to-day details of a user's business from one location); Time and Billing Module (used to efficiently records time and expenses and creates customized invoices and statements); Project Management module (used to track firm projects and tasks from a user's desktop for control of workflow processes); Client Management module (used to monitor client activity, including phone calls, email messages, billing, projects, deadlines, etc.); and seamless data sharing (e.g., seamless integration with Microsoft Outlook to promote peak productivity).

Figure 2:
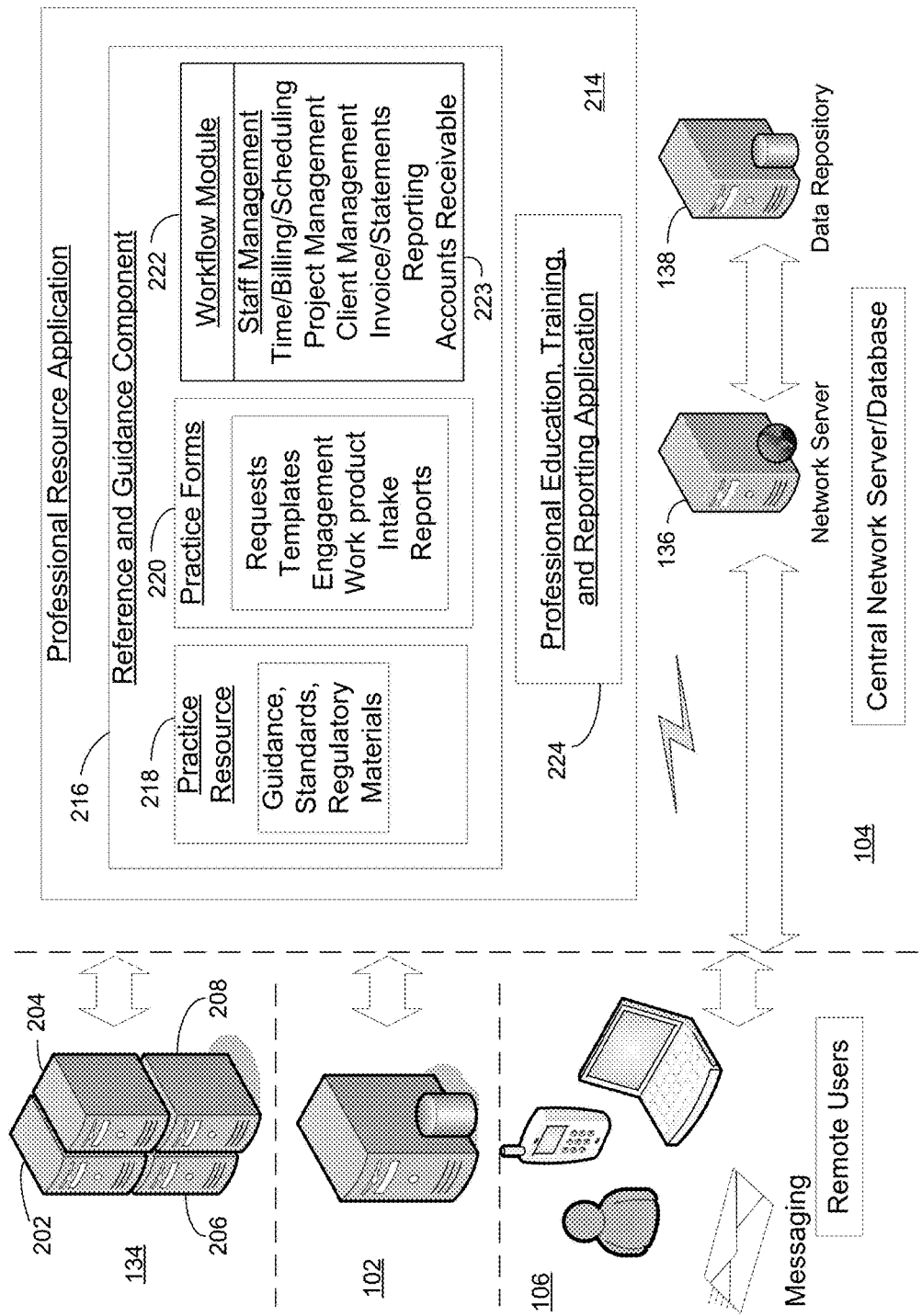
FIG. 2 shows a schematic diagram representing one example of data flow in accordance with the network of FIG. 1.

Referring now to FIG. 2, an exemplary PMS 104 is shown, for example Thomson Reuters' Practice CS and related services, comprising a Professional Resource Software (PRS) application 214 operating on Central (Network) Server 136 and operating in conjunction with a data repository 138, such as a relational database. Professional Resource Software 214 includes Reference and Guidance Component 216, which includes Practice Resource module 218, Practice Forms module 220, Workflow module 222, and Staff Workflow and Management Module (SWM) 223. Practice resource module 218 is adapted to present authorized users guidance, standards, regulatory and other materials and information to assist in the rendering of professional services. Practice Forms module 220 is adapted to provide authorized users with various practice related forms and related information used in rendering professional services, including requests, templates, engagement, work product, intake and reports. Workflow module 222 may be used to generate, implement and track work-related processes. Staffing, education and training processes may be the primary concern of workflows or aspects, reminders, etc., of such processes may be included in workflows generated by use of module 222. PRS 214 also includes Staff Management module 223, which may be integrated with and a part of Workflow Module 222. SWM 223 includes, e.g., client module, project (engagement) management module, time/billing/scheduling module and other functions as discussed in more detail hereinbelow. In addition, PRS may include a professional learning (education, training, and reporting) software component 224, which, for instance, when accessed by an authorized user, such as user system 108, presents a personalized learning web-page or portal directed to presenting a user interface or dashboard directed to the individual associated with the user account logged on. PMS users 106 and 108 may connect via central server 136 to access and interact with additional third party systems 134, such as education services systems 202, remote jurisdiction-based professional license and credentials systems 204, additional professional resource providers 206, and client network systems 208. Access to such third-party systems may be through access granted, such as by SSO or the like techniques, PMS 104.

PMS 104 allows users to draw from firm-wide information and tools from the convenience of her desktop/workstation, e.g., 110, 126. Digital dashboards enable firms to consolidate large volumes of information and data in a single location. For example, PMS 104 may be organized into three customizable digital dashboards (described in more detail hereinbelow), Staff, Client, and Firm, with each dashboard representing a collection of real-time portlets containing current information. With each dashboard users may create customized views to best meet system/firm needs. The staff dashboard allows staff to access information personal to the user and integrates with Microsoft® Outlook® email, calendar, and tasks. The client dashboard allows users to access demographic data, billing history, payment history, current balances, WIP, client specific emails, and other client-specific information. From the "Solutions" portlet a user may access PMS programs and any other programs used for each client. The firm dashboard provides an "at-a-glance" view of the state of firm receivables, billings, collections, profitability, staff productivity, and historical information. The use of and access to the various dashboards, and or information presented by each, may be controlled through authorization levels or other user defined attributes and responsibilities.

Figure 3A:
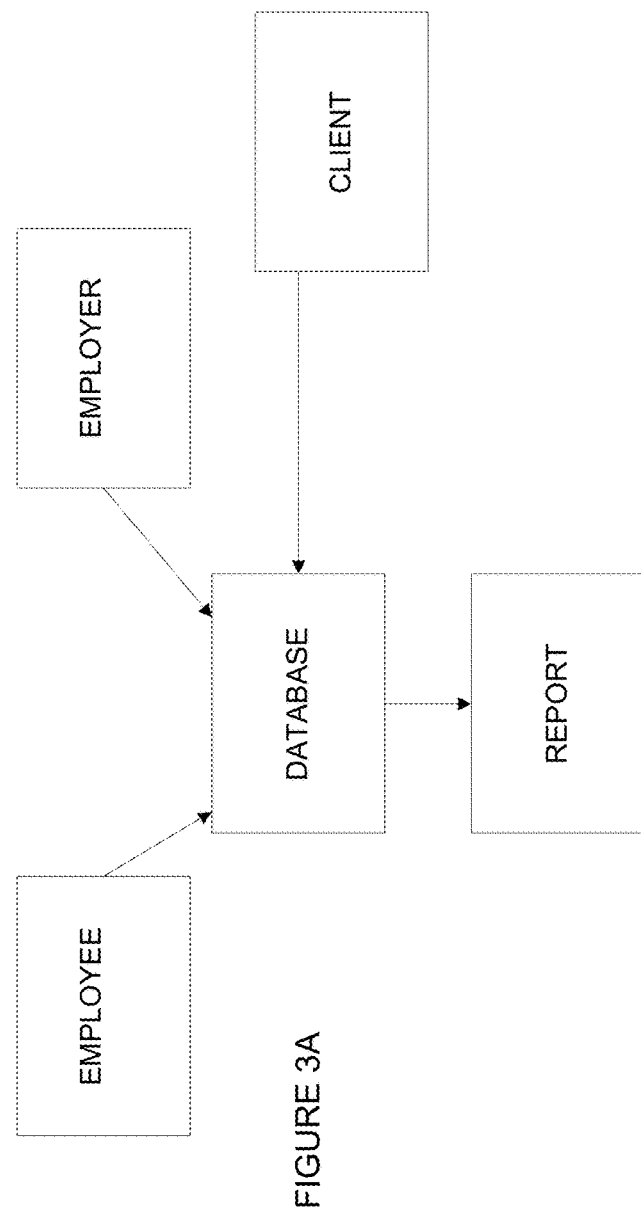
FIGS. 3A and 3B show a schematic diagram representing one example of data flow in accordance with the network of FIG. 1.
Figure 3B:
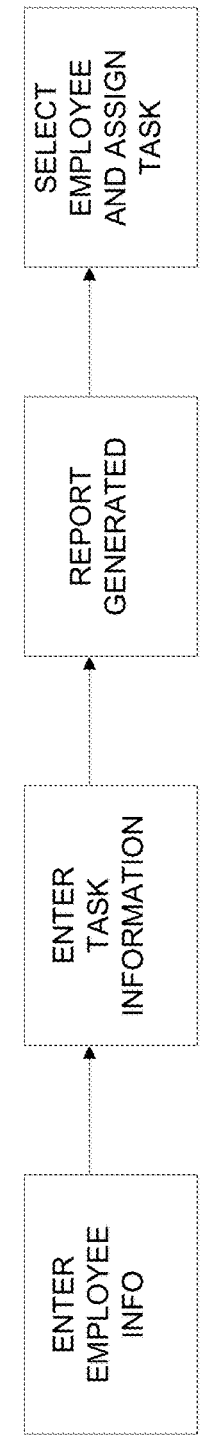
Figure 4:
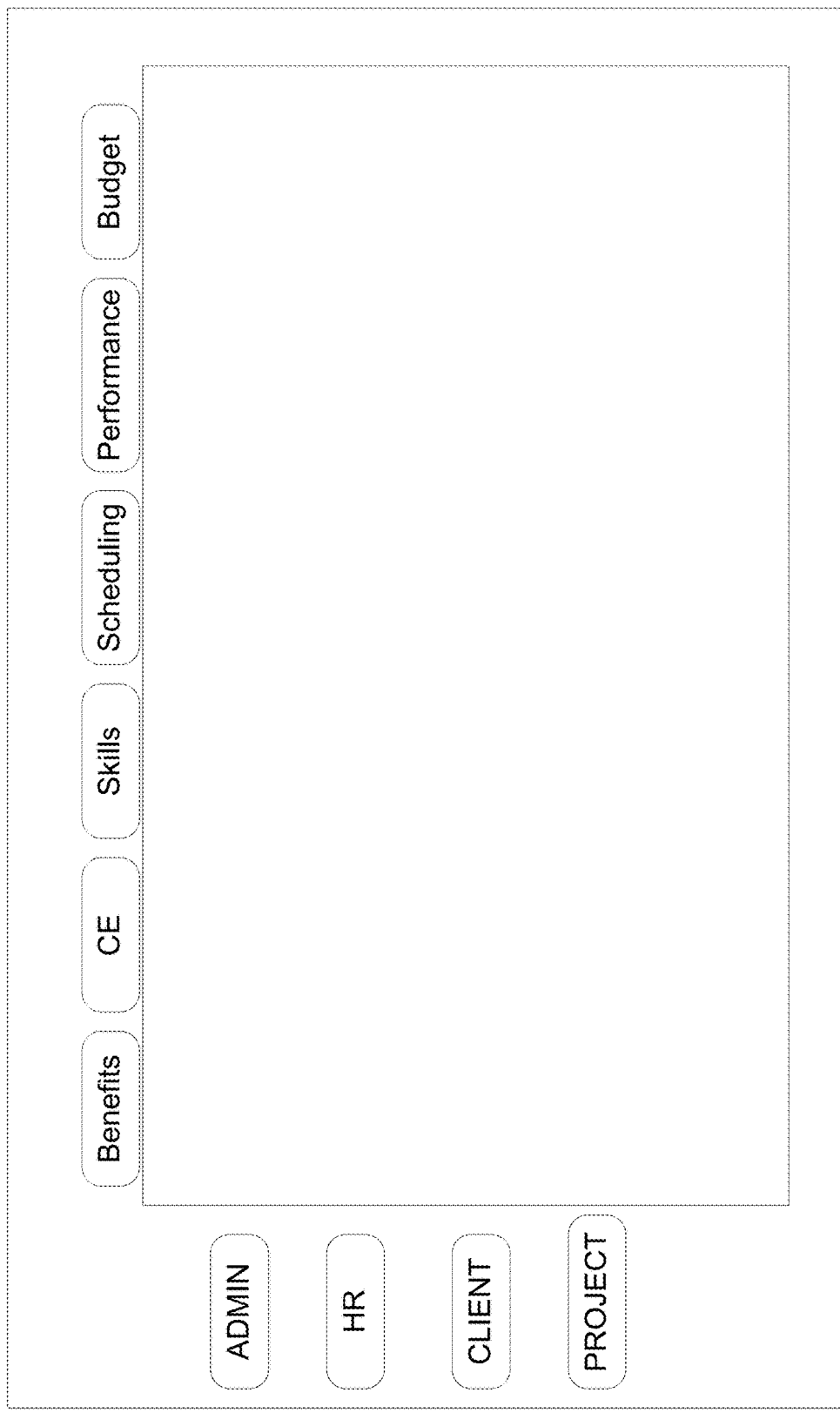
FIG. 4 is an exemplary screen shot in association with a GUI in implementing the present invention.
Figure 17:
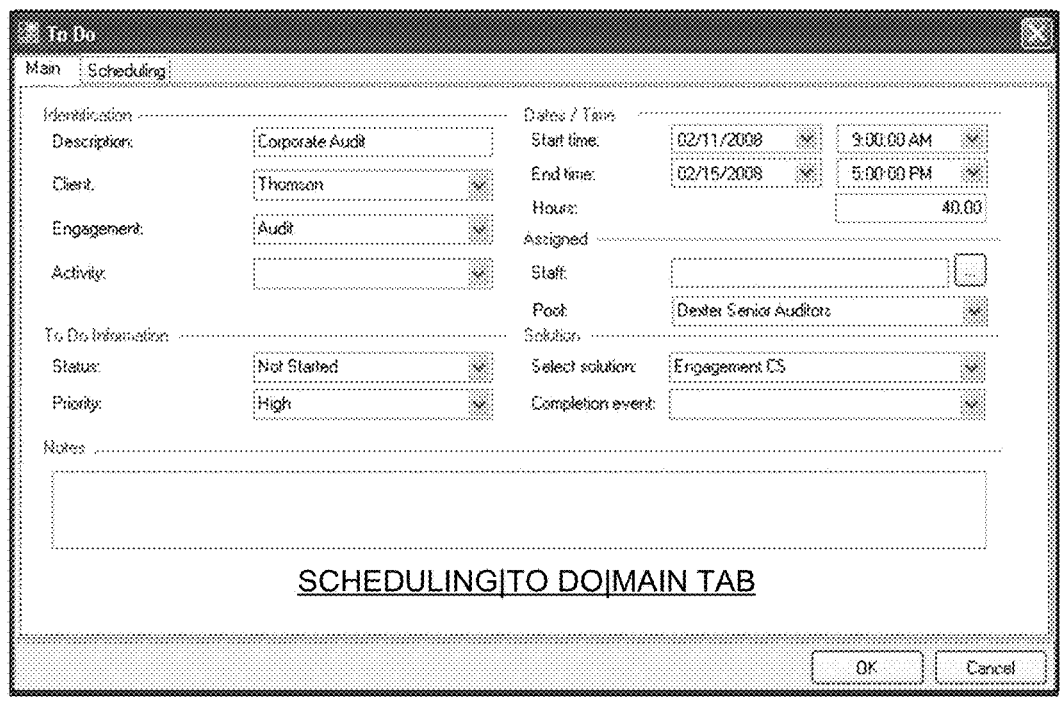
Figure 18:
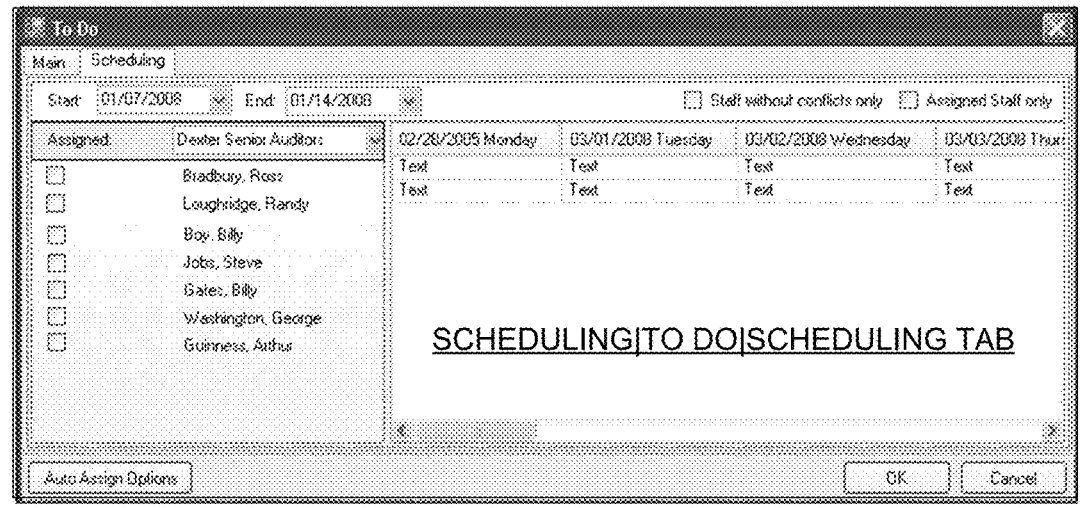
Figure 19:
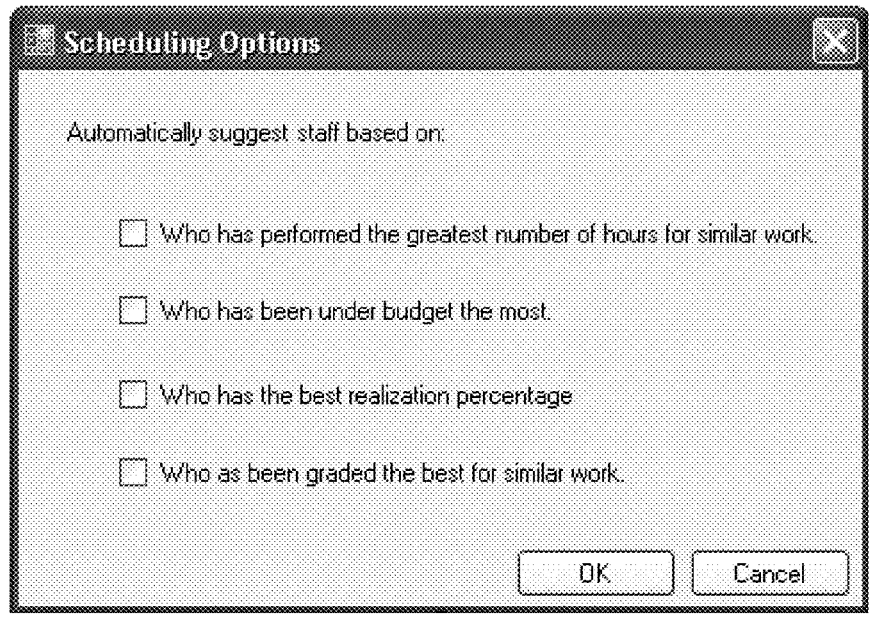
Figure 20:
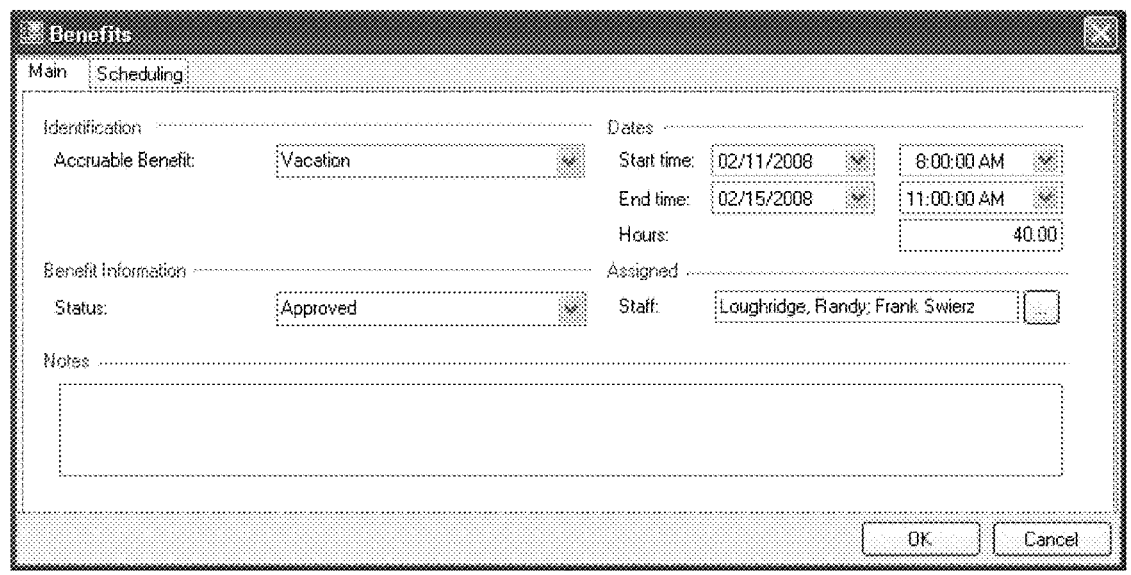

FIGS. 3A and 3B illustrate a block diagram of a basic workflow associated with the present invention. Employee (staff and parter), employer (firm), and client information is input and stored and maintained in a database accessible by the PMS 104, which is capable of generating various reports in association with staff workflow and client engagement in operation of firm business. Skills and other employee information is used along with task information, e.g., particular nature of engagement, for instance particular type of audit and in particular industry associated with a client, and based on the skill set and availability of an employee, PMS facilitates selection of employees for particular client related assignments and tasks. The information may also be used to manage employee training and certification management, e.g., continuing professional education. FIG. 4 illustrates an exemplary screen shot showing tabs for which various functions associated with PMS are performed as described in detail hereinbelow. Employee or staff "Benefits, CE (continuing education), "Skills", Scheduling. Performance and Budget help firms efficiently conduct the business of providing professional services. "Admin" relates to an administrator function, "HR" relates to a human resources function, "Client" relates to client relationship and engagement function, and "Project" relates to project administration function.

Figure 10:
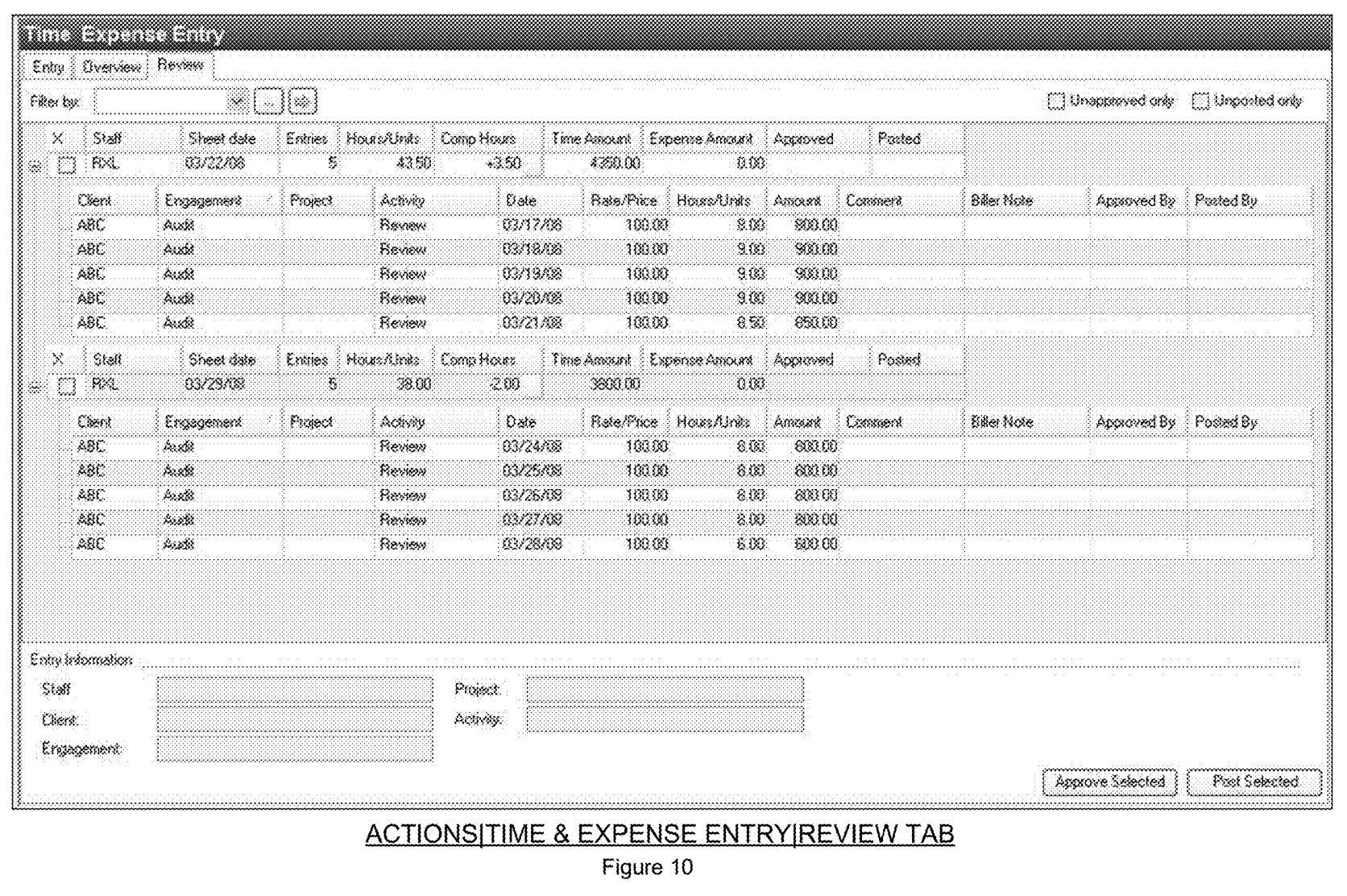

The SWM 223 includes a "Time and Billing" module that enables users to efficiently record time and expenses (FIGS. 8-10), create customized invoices and statements, record and track accounts receivable transactions, and create detailed reports and summaries. a desktop timer provides an automated timekeeping function for use with a variety of applications. The timer automatically records time spent on various projects. The user may then transfer data into the time and expense entry function for recording and tracking. This module includes reporting capabilities that enable users to access and print detailed information related to the user's business. The following are exemplary standard reports: listing production; billing; collection; and reconciliation.

The Time and Expense Entry function of PMS simplifies time entry fast and easy for staff with tools to ensure time is recorded accurately to avoid correcting mistakes. The advanced time and expense entry options in PMS enables users to: use one or more timers to capture time as it happens (when the timer is launched from the dashboard, PMS opens the client and starts the timer); have virtually unlimited filtering capabilities, such as client, engagement, staff, date, activity; maintain an audit trail of changes made to time and expense transactions; change the order of time entry fields to match data entry needs; customize the data entry screen with flexible user preferences specifying field defaults and skip or hide unused fields; enter negative WIP and expenses for adjustment purposes; select from choice of input screen views; add comments or notes for the biller with convenient comment fields that are available within each entry; enter time in minutes or hours depending on user preference settings; track time with a desktop timer that appears on top of other applications open; print Time Entry Journal for the current timesheet, which can be used for payroll purposes; enter time remotely even when not connected to the Internet.

The PMS includes a Billing System that is modifiable by the user depending on the particular needs, i.e., basic billing functions to complex billing scenarios. The Billing System enables user to: select from multiple billing methods, including for example: Detail Billing—Bill clients at detail or summary level; Quick Bill—Bill multiple clients for specified amounts on a single screen; Standard Bill—Bill multiple clients for the standard WIP amount with a single mouse click; Zero Bill—Bill selected clients' engagements at zero. The Billing System further enables user to: use the Smart Bill feature to bill multiple time and expense entries at one time with automatic allocation of billing and adjustment amounts; bill clients using a selected method; bill by project, activity, staff, or individual WIP item; use filtering capabilities in the selection screen to select which clients to bill; use the optional review feature to approve and post invoices; add an invoice note for future reference or staff review; create a single invoice for a parent client when a client family is selected; use the Compose tab to make changes to the detail section of an invoice (including: adding new rows with or without sub-rows; adding free-form text; deleting unwanted rows; changing dollar amounts to reflect detail); output invoices to multiple formats (including Net-Client CS, FileCabinet CS, GoFileRoom, Adobe® Acrobat® PDF, HTML, Rich Text Format, Text, Tagged Image File, Microsoft Excel, and email); create recurring invoices for flat-fee clients; and create progress billings.

PMS also provides an Invoice and Statement Processing function including an Invoice and Statement Format Wizard(s) to create client invoices and statements. With the Invoice and Statement system the user can: set up invoices or statements using formatting capabilities built into the program; control the level of detail you show your clients using flexible grouping capabilities; add A/R Aging, Ledger, and Recap sections as needed; add dunning messages that allow you to display previous balance reminders to your clients based on the age of their outstanding balance; include a pay stub at the bottom of an invoice; add a technology surcharge or a discount to invoices; make invoices available to clients via NetClient CS® portals where the client can view and pay the invoices online using credit cards or other forms of payment.

PMS also includes a Reporting function to access and print detailed information concerning firm, clients, and staff for effective review and oversight of business operations. The comprehensive reporting features enables users to: pull standard or custom reports onto dashboards, giving staff access to real-time information; use filtering function to identify clients and staff members based on various criteria; select the detail and groupings for each analytic report, such as by client, engagement, staff member, activity, or other, with appropriate subtotals; use Print Preview Find feature to locate specific details; drill down within each report to view and even modify underlying sources of data; have the flexibility to output and email different types of files (such as Adobe PDF, HTML, Rich Text Format, Text, Tagged Image File, and Microsoft Excel); send reports to, for example, FileCabinet CS or GoFileRoom; create profiles for frequently used reports to automate the reporting process; create custom reports using the custom report formatting capability; display report (standard or custom) on a dashboard for real-time review; access a library to view and download reports from the custom report library. Standard report types include: listing reports; production reports; billing reports, collection reports; and reconciliation reports.

Further, PMS may provide a Custom Format Designer to create/modify reports, invoices, statements, labels, and letters based on the needs of the user or firm. The designer function allows users to create and modify existing standard formats, including content, layout, and appearance, and add rows, columns, and information. The designer includes the following tools: click and drag from a list of available fields and properties; design multiple items simultaneously with the tabbed view; control formatting options for fonts including size, color, bold, italics, strikeouts, and underlining; use Rich Text with additional formatting; add lines, photos, logos, and watermarks; preview item being designed with live data; import and export formats; pull custom fields into a custom format; build calculated totals based on multiple fields. A Custom Formula Editor enables user to add calculated fields to custom formats and to modify calculations that are critical to analyzing procedures. For example: select fields and enter amounts to create custom formulas; add, subtract, multiply, divide, and create conditional expressions; save custom formulas for use with other reports.

PMS also includes an Accounts Receivable function to help firm's manage cash flow and accounts receivable. The Accounts Receivable function enables users to: enter receipts and apply them manually or automatically to outstanding balances; enter different adjustment types, including credit memo, credit card return, debit memo, non-sufficient funds, and write-offs; select from entry styles when entering receipts and adjustments; use the optional review process to require that all entries be approved and posted before inclusion in firm reporting, invoices, and statements; print a journal of receipts and adjustments from the entry screen; create service charges for overdue accounts; send customized statements to clients showing the status of their accounts; using a secure online portal, e.g., NetClient CS portal, allow clients to pay invoices by credit card. The payments may be automatically transferred to a PMS receipt entry. PMS includes a credit card processing function. Using InterceptEFT™, for example, a user can enter credit card information directly into the program, or using a standard USB card reader.

The PMS "Project Management" module allows users to track the status of firm projects and tasks for enhanced productivity. From the user's desktop, Project Management enables monitoring and managing of firm projects and tasks in real time, including control over workflow. By integrating with other professional suite programs, as well as other programs, the integrated system enables data to be captured automatically and updated within PMS. For example, when preparing a tax return in UltraTax CS, a user captures and updates time and billing data in Practice CS thereby avoiding the need to separately and duplicatively enter information and risk overlooking billable time. The system integrates the entire workflow process to keep track of data. The Project Management module allows users to: track project due dates and progress to ensure timely service and delivery to clients; monitor staff availability at a glance to ensure the right people are working on the right projects; ensure that billable time is effectively captured; monitor staff performance and operational efficiencies; and maintain control over workflow over a plurality of projects assigned to the user to promote productivity.

PMS provides a Project Management function that helps manage a firm's staff workflow, such as tracking and monitoring due dates, firm's projects and tasks directly from a user's desktop. In one manner, staff (via their staff dashboard) the tools to efficiently manage their individual responsibilities. Project Management allows user to: set up project templates that hold default information for project creation; import project templates from a pre-defined list for quick setup; set up notifications to inform staff members when client information for a project has been received; assignment changes are made, or when deadlines are approaching; control how recurring projects are generated with flexible project generation; create user-defined recurrences; manage project responsibilities from the Staff Dashboard by viewing assigned projects and tasks; view Outlook appointments, tasks, projects, and project tasks in an Outlook-style calendar; launch applications needed to complete projects from within PMS simply by clicking a project or task solution to have a staff member's work timed automatically; track actual vs. budget information to determine how your staff is progressing on a project; use the Manage Projects screen to update project and task information, assign work, and review your own workload; automatically complete projects and tasks in PMS; other application event status integration and move to the next step on a routing list; by project, group/filter reports, enter time/expense, and bill clients; track additional data on projects and tasks using an unlimited number of custom fields; using the "links" capability, associate files, folders, web pages, and FileCabinet CS and GoFileRoom documents to projects and tasks. Project Management reports may be generated and include: list of project templates; project budget to actual; project listing; project tracking; routing sheet; task budget to actual; and task tracking.

The "Client Management" module provides current information on client activity and enables users to record details of client activity. This module also facilitates communications with clients, including phone calls, emails, invoices, and face-to-face contact, by tracking client interaction and effectively monitor client activity. With this module, the user can logically organize, store, and access all client interactions in a single location for quick and efficient review. The Client Management module allows users to: record notes of client interaction, including phone calls, emails, billing, or face-to-face meetings; synchronize contact information with Outlook; automatically track time on phone calls, which can be invoiced with other billable time; generate reports grouped by referral source; view interactions by client, contact, or staff; and record phone messages, which show up on the staff dashboard, to provide a digital record.

PMS Client Management function provides integrated information concerning a firm's clients. The Client Management features provide CRM capabilities that help establish and maintain client relationships and client prospects and enables users to offer better service. Staff members and professionals communicate with clients in many ways, including phone calls, emails, invoices, and face-to-face contact. The client management function provides a system that tracks client interaction and monitors client activity and collects and presents critical client management information to users via dashboards and the like. Client Management is a tool that logically organizes, stores, and accesses client interactions in a single location for quick and efficient review by any authorized staff member from any location, e.g., via mobile device when outside the office such as when visiting a client. The PMS with Client Management enables users to: customize view of client and contact data to meet user/firm specific needs; record notes of every client interaction, including phone calls, emails, billing, or face-to-face meetings; access a contact list and view information for all contacts at one time; synchronize contact information in real time with Outlook, offering up-to-date contact information in both applications; automatically track time on phone calls, which can be invoiced with other billable time; record and track prospects won/lost information concerning prospective clients; track how new clients are referred to the firm or staff member; generate reports grouped by referral source to track referral activity; view interactions by client, contact, or staff to stay apprised of all firm activity; record phone messages, which show up on the Staff Dashboard, and send a notification, providing a digital record of all phone messages; print reports of all historical client and contact activity for quick, efficient review; seamlessly import client notes from your PMS professional suite accounting software.

PMS includes a Staff Management function to manage Staff benefits, targets, and schedules to help optimize current and future staff performance. Staff Management manages and tracks staff benefits and comp time, staff budgeting and targets, staff scheduling. Integrating Staff Management with PMS provides a system that can: maintain staff benefits automatically with program-generated accruals, automated balance reductions via time entry, and automatic adjustments for annual carryover rules; track accruable benefits, comp time, and firm holidays; set accrual allowances to be fixed based on months of employment, or based on staff levels; provide staff with benefit balances, projected accruals, and "to use" hours based on carryover rules; enable supervisors to view time-off requests and approve or deny them; set up per-staff targets and view targets versus actual results; manage and schedule staff assignments, including phone calls, benefits, meetings, and to-do items; define staff qualifications for schedule items and work queues; view staff workloads and re-assign schedule items; enable staff to view their schedules, workloads and items in the work queue; set reminders for all schedule items.

PMS may include a mobile aspect to enhance remote access to firm data, e.g., via mobile phone, iPad®, iPhone®. Mobile function is an application that may be loaded onto a user's mobile device to provide access to the software data used to make decisions associated with a professional services practice. Mobile function may provide access to not only firm PMS related content and data but also to other non-PMS, Enterprise data and software.

In one embodiment the present invention comprises a database and a central processing unit adapted to execute a software application including a graphical user interface GUI for performing staff workflow and management functions—SWM. The database of the present invention comprises employee, performance, engagement and task information. A first user, such as a manager, using any of a plurality of manager-side computers may input employee information. Such information may include staff filters, availability, skill set, past work experience, work complexity, budget v. actual hours, and realization. The staff filters criteria may include information such as past experience, office practice group, staff manager, staff supervisor, level, peer reviews, billing rate, seniority, skill development criteria, etc. The availability [a] criteria may include vacation time continuing education courses, meetings, and available hours. The skill set criteria may include professional credentials, capabilities, and expertise. The past work experience criteria may include client history, engagement experience, project or task experience, activity experience, industry experience, and usefulness to staff projects. Work complexity criteria may include the level of the complexity of the work previously performed by the employee. The budget vs. actual hours criteria may include the time spent on individual projects compared to the time budgeted for those projects. The realization criteria includes a calculation of the hours billed divided by the hours relieved, multiplied by 100. The first user has full read and write privileges to the date base. Read privileges refers to the ability to view a document and write privileges refers to the ability to edit and/or to overwrite a document. Read and write privileges allow the first user to view the database and make changes where necessary.

A second user such as an employee may enter additional information that first user has not entered such as the type of employee information to which the first user may not have access or authority. Such information may include availability, past experience, credentials, capabilities, etc. The first user, may edit the employee information entered by second user to ensure reliability and consistency. Further, changes made by the second user may be subject to approval by the first user before being accepted by the database.

When a task is to be assigned, certain task information is to be collected. Such task information includes the name of the client, nature of the work, complexity of the work, the volume or anticipated volume of the work, applicable deadlines, conflicts of interest, ability to pay, the industry, whether the industry is heavily regulated, forms to be used, priority of the assignment, etc. The first user then enters the task information collected into the database. The first user then uses the software application to compare the task information collected with employee information collected. The first user has the option of selecting which of the employee information will be analyzed by the software application. The software application processes the information and synthesizes the data into a report or other work product to automatically suggest employees to whom a task should be assigned. In an alternative embodiment, the software application may be used to automatically or semi-automatically schedule employees. The process performed is identical to that process for the automatic suggestion of employees. Automatic refers to processes performed essentially by computer, but may include human initiation.

In a preferred embodiment of the present invention, the software application filters results of the comparison by any employee information desired by the first user from the group of staff filters, availability, skill set, past work experience, work complexity, budget vs. actual hours, and realization.

In an alternative embodiment, the software application first considers the availability of an employee. This employee information relates to the ability of the employee to commit time to the project. A manager, supervisor or other person with authority may also review the availability assessment and execute a prioritization manually or otherwise to exercise discretion in assignment. Availability may be affected by other tasks assigned to the employee, meetings, travel or vacation time scheduled. The employees who are unavailable for work will be removed from the list of possible employees to be assigned the task. The software application next compares the task information such as the complexity of the work, the regulation of the industry, applicable deadlines, amount of work, and other such task information collected with the available employee information such as past experience, industrial experience, professional credentials, expertise, office practice groups, and other similar information. The list of employees falling within a specified range set by the first user will be further considered for receiving the assignment. The specified range can be any percentage range chosen by the manager of the results from the second comparison to create the second sub-list, but should be a reflection of the number of employees. The specified range may also be set as a range based on the number of results of available employees. Finally, a third comparison is performed, comparing additional task information such as ability to pay, complexity of the work and the nature of the work with employee information such as individual's ability, usefulness, capabilities, seniority, and skill development needed, creating a third sub-list. A report or other work product is automatically generated consisting of the individuals on the third sub-list. The names on the report are in order from top to bottom recommending the person at the top as being best suited to perform the task, e.g., based on selected or pre-defined criteria or parameters, and meet the client's needs. The manager may take the report generated and select any of the individuals named in the report to assign the task. Preferably, the manager will select the employee at the top of the report as they are determined by the software application as the best suited employee.

The SWM may also include an enhanced auto-scheduler that uses the analytics and subject criteria discussed herein to schedule staff for a given task or engagement. For example, scheduling criteria may include one or more in combination of objective, analytic and subjective criteria. Examples of objective criteria include: Staff Level, which includes Partner, Manager, Staff Accountant, Clerical, etc.; Availability, which may be based on work schedule; and Location, which may be selection based on staff location (multi-office firm). Analytic criteria may include three types: 1) Experience: Working in similar skill area; Working in specific industry (relevant & current); Working on specific client; 2) Efficiency: Actual vs. Budget for hours on projects; On all projects; On similar skill areas; and 3) effectiveness: Realization percentage; Write-Ups vs. Write-Downs; On all projects; On similar skill areas. Subjective criteria may include three types. First, Skill Sets type, which includes: Area; Rating; Skill sets which would be updated as projects are completed, would become dynamic and could be used to schedule future projects to people with the best skill sets for that specific project. By choosing staff that are constantly getting better (and educating the staff who underperform—via CPE), this follows the theory that constantly making small improvements is a driver for dramatic gains in productivity and quality. Second, Relevant Training type, which includes: Recent CPE in skill area; Continuing education factored into the rating for skill sets. Third, Quality type, which includes: Create 'grading system' for reviewing work; Performance evaluation for similar work; Evaluation factored into the rating for skill sets; CPE suggestions could be made for staff underperforming in certain skill area. These criteria are merely exemplary and the invention is not limited to this particular set or types.

In one embodiment of the SWM, a graphical user interface (GUI) is used to facilitate accessing functionality and navigation. One aspect to staff workflow and management touches on availability in light of known events, such as holidays, birthdays, or other events that may affect whether employees or staff members will be available for staffing projects. Often a human resources function, the system may provide or interact with a system than has a benefits module or function.

Figures 7, 8, 9:
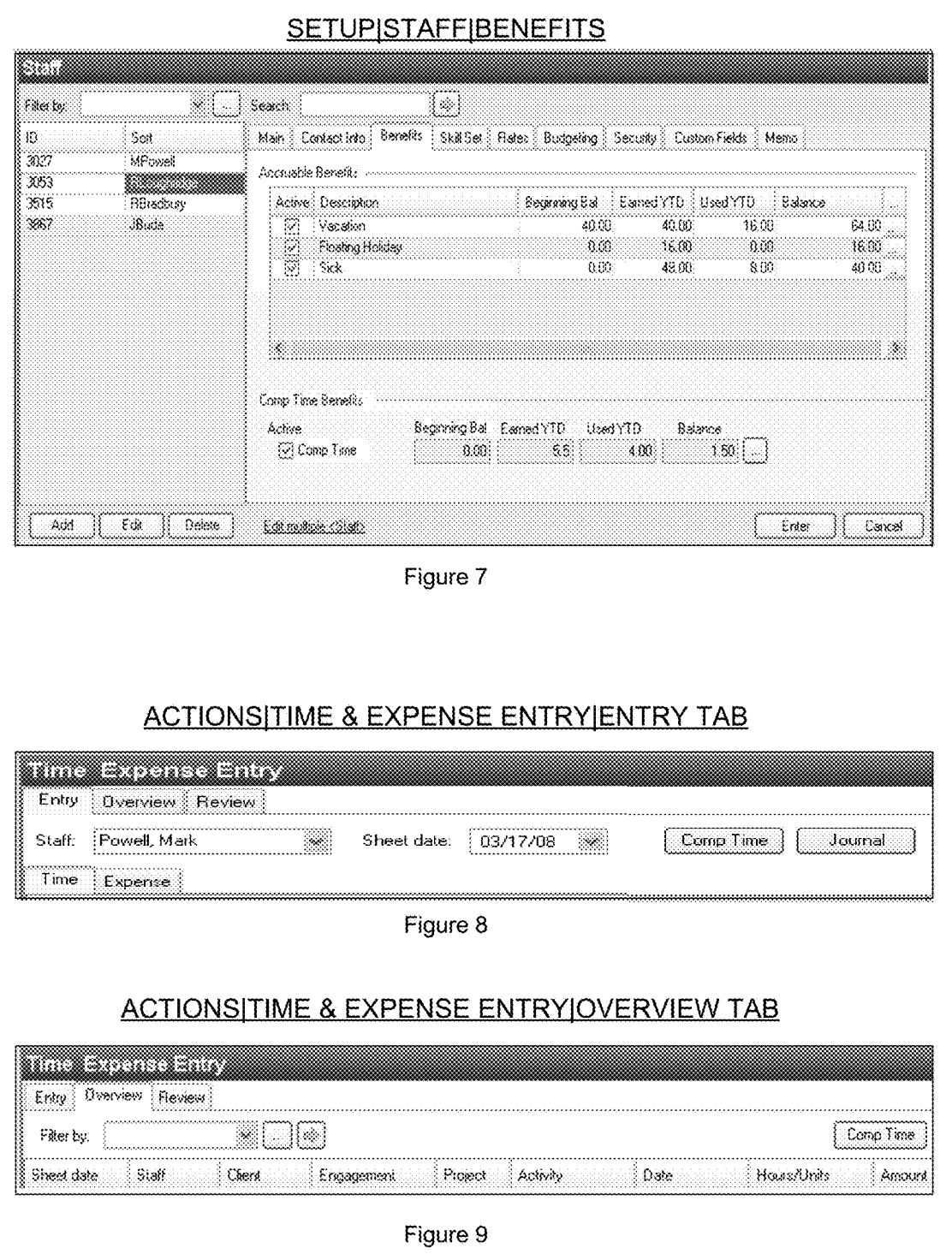
Figure 11:
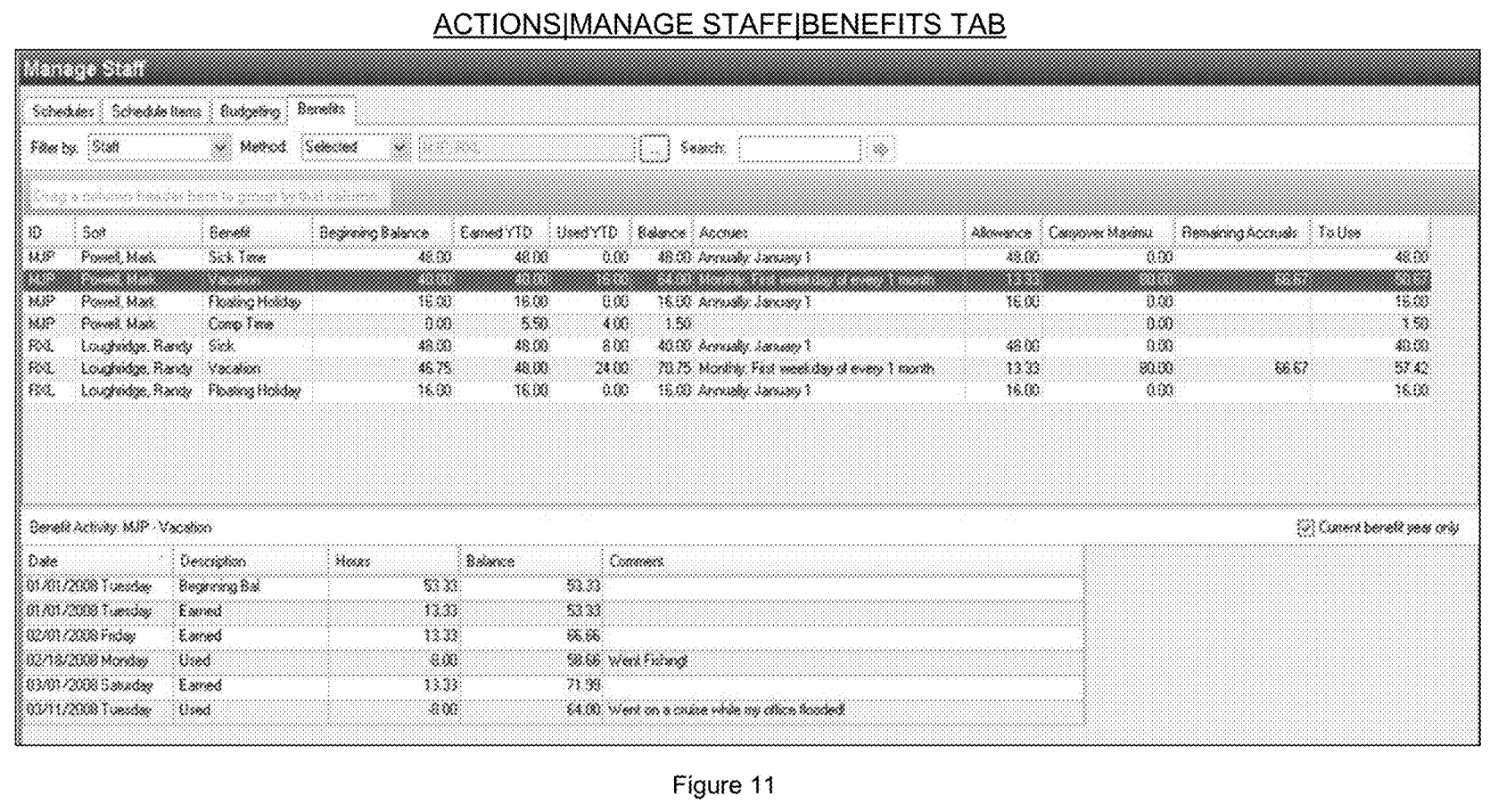

With reference to FIGS. 5, 7, and 11, for instance, a benefits tab may be provided as part of the GUI to allow a user, such as a manager or other operator of a firm, such as an accounting firm or other professional services firm, to specify the benefits year and observed holidays affecting their staff members or professionals. The GUI may include an interface with a date range allowing the user to enter the start of the year (month/day) to end of the year (month/day) as well as observed holidays and firm events, such as office closings, and engagement events. For instance, a manager or other user could input events associated with the company that is the subject of the engagement, for instance a manufacturing company that regularly shuts down its operations at times during the year. The schedule may likewise take into consideration the individual characteristics of the staff members, e.g., religious affiliation, locale holiday schedules, etc. The user may also be able to setup recurrence information similar to annual projects.

With reference to FIG. 7, the benefits tab functionality may be configured to allow the user to select the benefits that the staff is eligible for. For accruable benefits, the system may allow the user to pick the benefits that the staff earns or to enter balance information. A compensatory time or "comp time" benefits feature may be included to allow the user to choose whether the staff is eligible for comp time and/or to enter balance information.

The staff workflow and management GUI may also include a Notifications Tab function for notifying staff of certain events or conditions. For example, the system may be set up to notify staff when their schedules for the current day/week are changed or to notify select staff when staff are scheduled for more than their budgeted work hours. The system may be set up to notify supervisors or managers or others involved in firm operation. In the context of benefits, the system may be set up to: notify staff when they are approaching a limit for one of their benefits; notify staff when adjustments are made to their benefit balances; notify selected staff as they approach a predefined threshold; and/or notify selected staff when benefit accruals occur.

Figures 14, 15, 16:
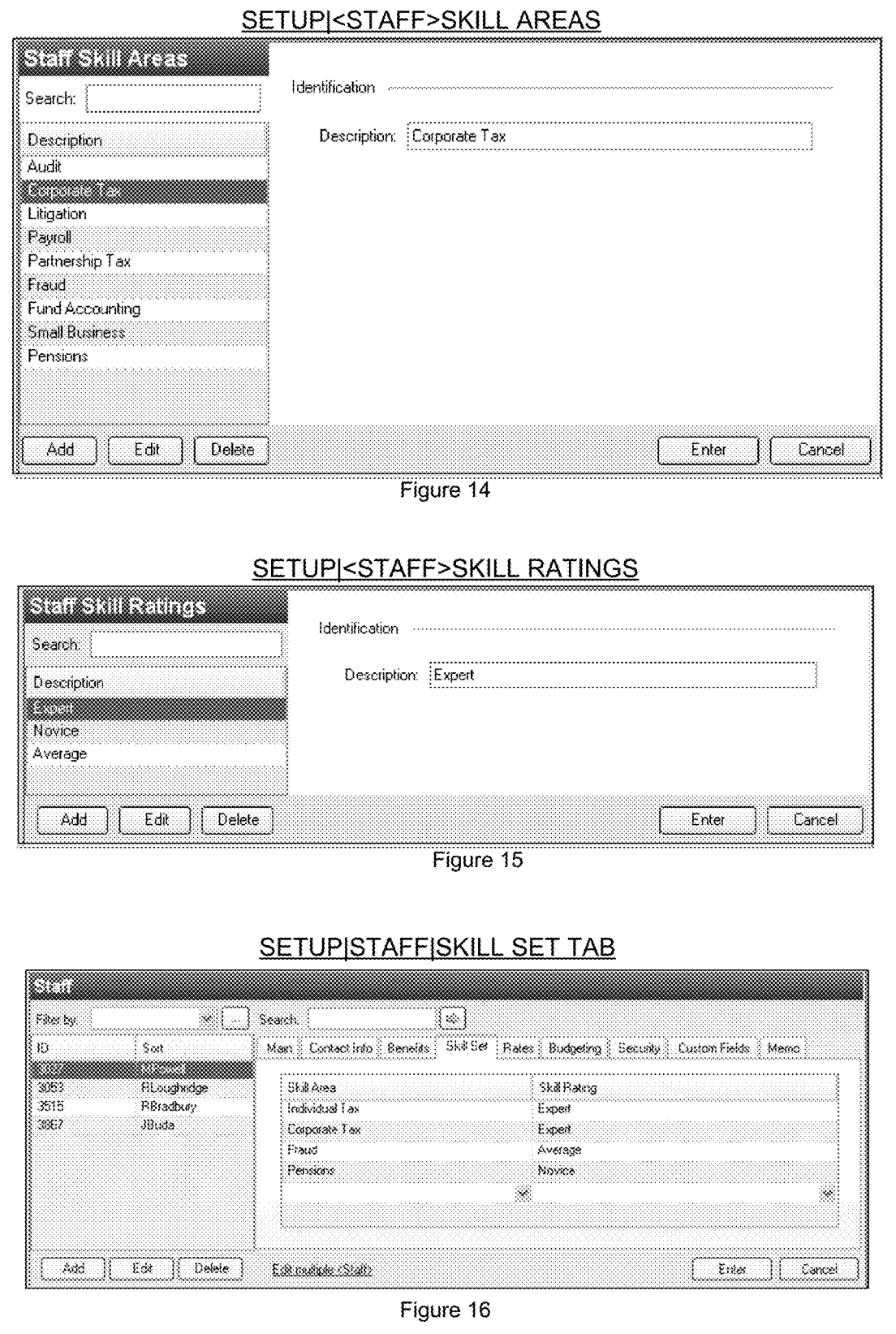

With reference to FIG. 16, in a setup mode, the staff workflow and management system may include a "Skill Set" tab that allows the user to select the skills that the staff possesses and specify a rating for each skill. In one embodiment, this may be represented as a grid where the user just selects the skill and then the rating. The skill sets may be built automatically for the user. The system may provide historical tracking of performance or rating information associated with staff members. The system may, based on staff past performance criteria or data, calculate or produce a grading or ranking of the various activities that a staff member performs. This function may be implemented similarly to the Auto Select/Auto Schedule criteria discussed below in the "Scheduled Time" discussion. For example, the staff workflow and management system may be used to evaluate the following staff performance parameters: past work experience; budget vs. actual hours; realization; and experience, to name just a few. Past Work Experience may represent data that may be used to help a user identify and locate the staff member(s) having the most experience working on a specific activity (e.g., greatest number of billed hours on a particular client, geographic area, subject or field of work, project, etc.). Budget vs. actual hours may represent data directed to tracking efficiency, e.g., a staff members budgeted number of hours for a project or a task compared to actual number of hours worked in the project to determine an over or under budget rating, indication or the like. Clearly mechanism may be included to take into account other contributing factors, unforeseen difficulty, mission creep, inaccurate budgeting process, etc. The system may calculate the realization of past work to determine staff realization percentages and may be used as a tool for identifying over and under performing staff members. In one example, realization may be calculated as relieved amount divided by billed amount times 100. For instance, if a staff member accumulated $100 in work in process and the firm relieved all of the work in process by billing $130, the staff member's realization would be 130%. A staff member's experience may be based simply on the number of years of service, number of hours in a particular field or assignment or position, or may be a combination of factors such as education, professional accreditation, work history, etc.

The SWM of the present invention may also include a CE Boards Tab that allows the user to select the Board(s) that staff members belong to and set the requirement information that staff must fulfill.

The SWM can have the further advantage of allowing a user to specify which administrative activities represent, for example, accruable benefits, banked time benefits and CE time. The system allows a user to add an "Administrative Type" drop down field below a class field. For example, this feature may be available if "type" is set to time and "class" is set to administrative. Drop down values may include: General—Default for new Admin Activities; Accruable Benefit—Used for benefits such as Vacation, Sick Time, PTO; Comp Time Benefit—Used when banked time is taken; and CE—Used for CE training. If the Administrative Type is set to Accruable Benefit or Comp Time Benefit then the field may have an additional ellipsis button that gives the user access to benefit setup information. The accruable benefits feature may allow the user to specify, for example, one or more of: Accrual Methods, e.g., anniversary, annually, monthly, weekly, or biweekly; Date of accrual; Allowance, e.g., fixed amount or based on seniority; and balance reset information, e.g., reset annually option, reset beginning balance to zero, and carryover maximum. Comp Time benefits may be set up to allow the user to specify one or more of: when comp time accumulates, e.g., weekly, bi-weekly, or monthly; method, e.g., accumulate for time worked over a specific number, or accumulates for time worked over expected work hours; allowance, e.g., straight factor or factors based on the time of the year; and balance reset information, e.g., reset annually option or reset beginning balances to zero with carryover maximum. Additionally, the system could automatically designate time associated with a Holiday Activity.

With reference to FIG. 14, the staff workflow and management system may be configured to allow a user to setup a "skill" description to associate with individual staff members, which may then be used to group, associate, differentiate, assign tasks, etc with and to staff members. With reference to FIG. 15, a "skill ratings" description may be available to a user to associate skill ratings related information with individual staff members.

The Staff workflow and management GUI may also include templates and the like for establishing and implementing a continuing education ("CE"), e.g., continuing legal education ("CLE") or continuing professional education ("CPE"), compliance management function to track, maintain and manage information and credentials related to individual staff members. In the alternative, the staff workflow and management may be adapted to interact with such systems. For example, the CE function may be adapted to permit a user to setup the CE boards that staff members, such as certified public accountants ("CPAs") belong to. The boards, for example, may hold the following information: identifying information, e.g., ID or member number; description; cycling period; e.g., annual, biennial, or triennial; reporting date, e.g., should allow for odd-numbered years or even-numbered years; required number of hours and/or qualitative characteristics; specific requirements, e.g., category or hours—min/max; automatic calculation of carryover credits or credit shortfalls; fees associated with reporting credits; compliance period extensions; notification of rule updates and/or rule amendments; certification requirements, e.g., CFE, CFP and AVA. The requirements and accreditation may be related to organizations such as AICPA, PCAOB, ABA, state bar associations, state accounting associations, etc. The system may include an automated or semi-automated email feature that generates and issues email notifications related to CE management function. The CE function may include the ability to remotely connect to or receive information from external sources of CE related information to update, load, maintain, etc. the staff workflow and management system's database of CE related information. For example, the system may include, interact with learning management systems or be adapted to access information regarding state, federal, local, board, etc requirements from such systems or resources, e.g., as provided b Reqwired, Inc. Fields for CE "board requirements" may be set up, for example, accountancy, auditing, professional ethics. Also fields associated with "course delivery methods" may be set up, for example, in-house, live seminars & conferences, on-line learning, self-study. Also, fields for CE "course sponsors" may be set up, for example, AICPA, State Accounting Boards, PCAOB, ABA, state bar associations, etc. The GUI may include a CE tab to show staff information regarding the requirements of the boards to which they belong and a status of how many credit hours they have earned and/or have remaining to earn and over what period of time.

The SWM may include a CE course presentation or delivery function. For example, a course setup screen may be accessed in, for example, Time & Expense Entry when the user makes an entry using an Activity that is a CE Activity and when new courses are being scheduled. The Courses form will hold information such as Date, Board, Instructor Name, Staff, Credit Hours earned, Sponsor, etc. In addition, the system may allow administrators to create learning plan templates for groups of employees. Once a template plan is assigned to staff members, the plan can be customized to fit particular learning needs on an individualized or group basis. Also, the system may allow administrators to create learning plan audits to track and report on how well staff members are meeting learning expectations and tailor future curriculum planning.

The SWM includes a "Scheduling" function that may be set up and used to schedule staff resources, allocate staff time/resources across projects (both nonbillable and billable), implement or review project scheduling, among other things. For instance "Scheduled Time" may be a form used for scheduling various Activities and may represent a scheduled/planned sheet entry. Once an event or item is scheduled, it appears on calendars and timelines, for instance the SWM may synchronize with MS Outlook so as to present scheduled events on individual staff member, manager, supervisor, or other calendars. Items that can be scheduled include the following: Activities—this could be anything, billable time, non-billable time, and administrative time, from scheduling an appointment with a client to performing firm billing; Benefits Hours—for instance scheduled vacation time, planned use of Comp/Banked Time; CE—Time scheduled for taking CE courses; Projects; and Tasks. Scheduled Time form may consist of the following properties: Staff; Skills; Date/Time; Client; Engagement; Project; Task; Activity; and Solution. The "Skills" property allows the user to specify what skills are needed for the scheduled item. The "Solution" property allows the user to associate an application with the scheduled item. The "Staff" property represents the staff member that the item is being scheduled for and may include one or more of the following elements. A "combobox" drop down to reveal for selection from among active staff An "Auto Suggest Staff" function such that at the time a user is to select staff member(s) to schedule an item, the SWM may provide a list of staff prioritized by the most qualified staff, such as based on staff properties and system calculations. The system calculations may be based on selection criteria specified by the user, for example the "Auto Suggest/Auto Schedule" criteria discussed below. An "Auto Schedule Staff" function allows the user to select a group of staff, this "pool" concept allows automatic scheduling. This allows users to assign the item to a group of staff and then the item can automatically be assigned to the first available staff. Staff may be scheduled automatically based on, for example, the same selection criteria discussed below for "Auto Suggest/Auto Schedule" criteria.

The Scheduling function may utilize a number of criteria and information in automatically or semi-automatically handling the function of identifying appropriate staff and assigning staff to projects in an efficient and effective manner. For instance, "Auto Suggest/Auto Schedule" criteria may be used and may comprise a combination of system filters and calculations. The criteria used for Auto Suggest/Auto Schedule may be specified by the user at the firm level. In one configuration, the system evaluates staff and determines the most qualified staff based on: staff filters; availability; skill set; past work experience; work complexity; budget v. actual hours; and realization. "Staff Filters" allow the system, as elected by a user, to filter using one or more property. Some examples include, Staff Office (location), Staff Manager, Staff Supervisor, Level, Custom Fields (User Defined Fields) and, Years of Service. "Availability" may be used to determine which staff members have available work hours for the time being scheduled. "Skill Set" may be used to identify those staff members who have the skills/specialties/expertise necessary to complete the scheduled item. "Past Work Experience" may be used to identify the staff with the most experience, e.g., greatest number of hours, working on the same client, industry, engagement, project, task, and/or activities. "Work Complexity" may be information derived from the complexity of the work done by the staff, e.g., the staff's performance can be weighted. "Budget vs. Actual Hours," e.g., where the item represents a project, ay be used to locate staff that have the greatest percent of actual hours under the budgeted hours for projects originating from the same project template. "Realization," in one scenario, is where the SWM calculates the realization of past work to determine which staff had the greater realization percentages. "Realization" may be represented as a percentage calculated as Billed Amount/Relieved Amount times 100. For example, if a staff member accumulates $100 in work in process and the firm relieved all of the work in process by billing $130, the staff member's realization would be 130%.

The SWM has numerous "Actions" that are coordinated, permitted, processed and logged. For instance, under "time and expense entry or reporting, the system may be configured to prevent staff from entering benefit time used to benefit "Activities" that are not active for them, and to prevent staff from entering benefit hours that exceed their active benefit balances. Also, when staff members enter time using Activities that represent CE time, the system may provide a way for the user to enter course information or possibly select a previously scheduled course. Another "Action" that may be made is "Manage Projects," which allows a user to implement projects/tasks into scheduling. For instance, are the "target" dates/staff assignments to cover the scheduling or are those data strictly tentative "targets" and not actually scheduled unless a scheduling staff member specifies an exact date/time.

The system may be set up to "Manage Projects" or to assign projects or tasks to specific staff or more loosely or collectively, for instance to assign such activities to staff "pool" groups. In this manner, a scheduler can use the system to assign an engagement, task or project to a group of staff where all staff in the group is capable of handling and completing the task or project. In this manner, pooled projects may be assigned to grouping of staff members having similar capabilities and the particular individual staff member actually performing discrete tasks or projects is not critical. Moreover, anonymity at the assignment stage may be desired. For instance, the first staff member in that group with available time will take on the Project/Task and it then becomes assigned to them.

The SWM may be provided with peer review or staff review functionality, or to integrate with other applications and databases providing such functionality and data, to collect, track and analyze staff member performance. Performance data may then be used for scheduling and CE purposes, for instance, and to form appropriate groups of staff members or teams to work on particular engagements or for particular clients or industries. For example, a firm may not want to assign a majority of lower performing or inexperienced staff members on engagements even if the scheduling data indicates availability. History of team members and of working together, such as particular staff members with each other and with a firm partner or manager, may be used by the SWM to assist a user in formulating an effective and harmonious team for future projects or engagements. Also, history of negative or positive client comments associated with staff members may be collected and analyzed and used in determining teams or assignments for that client or clients having similar needs and characteristics.

One way the system may be set up to "Manage Staff" is through the "Benefits" tab. One goal of the Benefits tab will be to give staff members, respectively, the balances for their active benefits and to view details as to how the benefit time was used. The Benefits tab may utilize, for example, a primary grid consisting of rows for each staffs active benefit and a secondary grid consisting of the sheet entry information for the selected row in the primary grid. The sheet entry detail in the secondary grid may show the user the benefit time in detail. Another feature that may be provided is to automatically update staff availability on a Staff In/Out Board when staff use certain benefits. A user may associate benefits to Staff In/Out availabilities. For example, the user may associate the Activity that represents vacation time used to the "On Vacation" or "Out of Office" Staff In/Out Availability. The system may automatically set their Availability on the days the vacation time is entered. The SWM may integrate the benefits function with external programs, such as Human Resources Information System (HRIS) software, for benefits tracking.

The SWM GUI Scheduling tab may provide a calendar or timeline view of staff schedules and give users the ability to modify items on the schedules. The schedules may include items such as: expected work hours, may also calculate and show the available hours (expected hours less scheduled hours); firm holiday schedule; MS Outlook appointments and tasks; and scheduled time, e.g., projects, tasks, CEs. The scheduling/calendar functionality may include one or more of the following. Group calendars to enable staff or managers to display schedules for various staff simultaneously. Exchange server will be a requirement to include online OL data for multiple staff simultaneously. View Options to provide different views (Month, Week, Day, Gantt). The system may be set up to allow a user to change what the calendars are based on and filter. The most common would be Staff, this would give you a list of staff and the items for which they are scheduled. We need to be flexible for other views. For example a staff assigned as the Responsible for Projects might want to pull up just their Projects and modify staff assignments for the Projects and Tasks. Possible groupings and filters include: Staff; Staff Groupings; Client; Client Groupings; Industry; Team; Engagement; Engagement Groupings; Project; and Project Groupings. The scheduling function may include techniques such as color coding or other visualization technique to distinguish the different types of items on the calendar and/or conflicts. Conflicts may include time periods when the staff member is scheduled beyond their work hours or when multiple items are scheduled to occur simultaneously. As presented to users, days or hours or times that are scheduled may be blocked out or color coded to reflect scheduling conditions. A conflicts reporting function may be included to notify users of conflicts that arise and may also include an automated or semi-automated conflict avoidance solution or suggestion or even an alternative assignment date or alternative staff member in the event of conflicts.

The scheduling function may also include a "Resources Request Process" with which users may request time, such as benefit related time, comp time, etc., and the system may reflect the request as an "unapproved" Scheduled Time item that is posted into the calendars. In one alternative, it is only tentatively shown on the calendar or may not be incorporated into the calendar until approved, such as by a partner, HR person or manager. Requested Benefit Time example: if a staff member wanted to take vacation time for a specific time period, they could enter unapproved scheduled time that could later be approved and posted to the calendars by manager. This time may or may not show up as a conflict to other scheduling events. Resource Request example—a way for supervisors, partners, managers or the like to request staff time for projects. This may or may not be specific to individual staff members and may be based on needed skill sets that are associated with one or more staff members. Unapproved scheduled time may be then approved or posted by an authorized person and specific staff members or pools may be assigned. The SWM may integrate the scheduling function with external programs, such as Thomson's GoFileRoom software, for project tracking.

In another alternative, the SWM GUI may include functionality, including a tab or the like, related to Staff Budgets including Expected Hours. This functionality may be used to setup budgeted hours and amounts for each Staff member. The hours initially setup may be considered the available work hours that can be scheduled for individual staff members. A budgeted hours/amount component may be used to specify billable hours/billable amounts and non-billable hours/amounts for each staff member. In this way, the SWM allows a user to specify time periods for budget hours/amount that is period based, for example, monthly, semimonthly, or weekly. Alternatively, the system may provide a user with a calendar and a form with options for scheduling one or more staff members, with filtering if desired, and to specify a time period, number of hours per day, and a billing rate that may be used for calculating the budget amount. The SWM budgeting function may be adapted to update budgeting/scheduling information based on a different or past time period's budget or actual values and may be able to increase/decrease set values, e.g., by a percentage.

The SWM preferably provides reporting for various activities and functions. For example, "CE Reports" may provide a list of CE Board Templates that lists the CE Boards and their requirements. A CE Staff Summary report may be generated to show the credits earned and credits still needed for each staff member, or by group, etc., and may include a detail option to show course information. Additional items of information that may be collected, processed and displayed includes historical course attendance, cost of CE training (e.g., based on year, staff, or staff level). Scheduling Reports of a variety or forms and having a variety of contents may be generated by the system. Once the SWM has access to data, a variety of presentations of such data is available to the user using well known techniques. For example a "Staff Schedule Summary" report may be a summary showing how many hours scheduled vs. available for a given staff member, group, engagement, etc. Comparison reports may be generated, for example a Staff Budget Hours vs. Actual Hours report may be generated for reporting up chains of responsibility and for tracking of critical operational data and for ease in decision making Benefits Reports may be generated to report a variety of benefits related information at the individual staff member, across groups, engagements, clients or across the firm organization. For example, a Staff Benefits Summary report may display benefits related information, such as comp time, vacation time, etc. and may show balances such as annual beginning, used, earned, remaining, and rolled forward. Reports may be automatically or semi-automatically generated periodically or individually called by users based on need and may include export functionality to export reports in user desired applications, e.g., MS Word, MS Excel, Lotus, Snapshot. The CE functionality may include the ability for users to create their own CE related materials or to track and set up internal CE events, such as courses or to interact with other solutions that provide related functionality or content. This aspect may be tied in to scheduling functionality to assist users in determining opportune CE event times or place events in user's and staff member's calendars.

The SWM CE functionality, as integrated with external applications or resources, can provide CE tracking including: determining compliance periods, tracking simultaneous compliance periods, tracking credit categories, tracking prorated credit requirements, enforcing limits on CE format types, calculating carryover credit, making adjustments for reporting period extensions and tracking special requirements for newly-admitted licensees. CE data may be updated through monthly rule updates that are automatically integrated into the tracking system. The CE functionality may provide, for instance, coverage for the Accounting Industry, including state CPE rules and Yellow Book requirements, PCAOB requirements, in-firm requirements, the requirements of IRS enrolled agents and AICPA members, as well as the requirements for a variety of certifications such as CFE, CFP, and AVA. The system may generate email reminders to inform staff members, such as accountants, of their continuing education status.

The SWM GUI preferably includes a "Dashboard" for presenting information to users in an easy to access, review and navigate manner, especially items of particular and often daily importance given the user's responsibilities and needs. The SWM may integrate directly into a firm's existing dashboard functionality to integrate the staff workflow and management function into an overall practice management solution. Just as the SWM may receive information from an overall practice management solution, e.g., Thomson's Practice CS, and/or other discrete modules or applications, e.g., other scheduling or learning management systems. Various dashboard configurations may be tailored to reflect the needs of the user and perspective of the organization. There may be for example a "firm dashboard," a "staff member dashboard," a "manager/partner dashboard," and/or an "HR dashboard."

PMS provides an integrated workflow management system, preferably in the context of a practice management software program enabling firms/users to manage an entire professional practice. PMS provides firms with valuable insight into business operations, enhances client service, and increases firm productivity. PMS includes "digital dashboard" functionality that provides real-time status information at employee, firm, client, and staff levels. PMS integrates workflow processes so that data in other programs may be automatically captured as work progresses and updated in the PMS.

In one embodiment, PMS provides four customizable digital dashboards that let users monitor key information specific to an associated firm, clients, staff, and products. Within each dashboard is a collection of portlets that provide snapshot views of critical, real-time information involved in operating a practice, such as an accounting firm. The portlets include data such as email, billing summaries, receivables, staff availability, and other relevant information. Portlets may also serve as convenient links to additional resources within a firm—including frequently accessed programs, website links, and documents. For instance, an accounting firm that uses a suite of products, e.g., Thomson Reuters' FileCabinet CS® or GoFileRoom®, can access such professional services applications as well as firm electronic documents. FileCabinet CS or GoFileRoom portlet may be integrated in one or more of the digital dashboards. PMS uses browser-like navigation that enables users to move back and forth within programs. A navigation pane is provided to allow a user to navigate among the various dashboards, actions, or setup options. Dashboards can be used in a pre-configured format or may be modified to meet user or firm-specific needs. Dashboards provide views of key firm, client, and staff information and product information. For instance, a user may use the browser-like navigation bar to quickly move forward and backward with one click; double arrow to display or hide the navigation pane; right-click the dashboard or click the Select Portlet link on the top right to add or hide portlets; move, or resize portlets within the digital dashboard to modify display; and navigate between firm, client, and staff information.

In particular, PMS provides a "Firm" dashboard, which provides a quick view of the state of the firm production, billings, and staff productivity. This consolidated view makes provides automated, quick view of the firm's financial status without having to search in multiple locations. To maintain security, the "firm" view may be restricted, e.g., to partners and/or other selected employees. Various portlets and functions may be included in the dashboard interface. Firm partners and other authorized staff can refer to the Firm Dashboard to review such items as: key financial totals; recaps of work in process (WIP), due dates and accounts receivable; summary of staff hours and billable time, as well as staff availability; standard or custom report. A report can be added to the firm dashboard as a portlet, allowing firm members to get real-time data on-screen—without having to produce a report. A "Staff Targets" portlet may be included to help compare actual staff hours and billable amounts with targets to evaluate staff in real time and allow for corrective action to improve efficiency. A "Staff Summary" portlet provides a summary of staff hours, including total hours worked, billable hours, and billable amounts. A user may access key software and tools in the "Solutions" portlet, e.g., access FileCabinet CS and/or GoFileRoom documents. A portlet may also be included to allow users to access key totals, such as production, billings, and collections as of the current date, month-to-date, and year-to-date.

PMS may include a "Client" dashboard, which collects and presents critical client information, including contact information, demographic data, work in process, billing activity, payment history, current balances, and more. The Client Dashboard may also contain a Solutions portlet, which organizes all of the documents, applications, and links associated with specific clients. From the Solutions portlet, a user may access: CS Professional Suite and Enterprise Suite programs and any other programs that you use for each client; documents including Microsoft Office documents (e.g., Word and Excel® files); and links to frequently accessed websites or integrated online resources, such as Checkpoint®. The Client Dashboard displays the Client Management Interactions (discussed elsewhere herein) portlet to create a comprehensive view of interactions associated with a given client—including phone messages, emails, and notes.

Various portlets may be provided at the Client Dashboard allowing users to: access client profile information; access key software and resources for each client; view email messages specific to a client; view key production invoice and collection totals; view interactions associated with a given client; access FileCabinet CS and/or GoFileRoom documents related to the selected client; view a Work in Process recap; view an Accounts Receivable recap; and view a Billing Summary.

PMS may also provide a "Staff" Dashboard, preferably adapted to work seamlessly with firm applications, such as Microsoft Outlook Mail, Calendar, and Tasks, to provide a firm's staff with a convenient workflow hub. The Staff Dashboard allows staff to perform daily tasks from a centralized location, rather than having to navigate multiple programs. The Staff dashboard is preferably modifiable to meet specific firm/user needs and handle a variety of tasks, including: view Outlook Calendar, Mail, and Tasks; view a list of outstanding projects and tasks; view schedule with assigned projects and tasks and Outlook appointments; access FileCabinet CS documents (if licensed); and view information for entered time. The Staff dashboard in combination with the Project Management function (described elsewhere herein), Workflows may be streamlined. From the Staff Dashboard, a user can view up-to-the minute project information. For example, the "Notifications" portlet displays key information for staff, such as assigned projects and tasks, approaching deadlines, or when client information has been received.

The Staff dashboard allows user to: view a complete schedule, including Outlook appointments; link directly to user Outlook email; access key software and resources, e.g., in the Solutions portlet; view critical notifications; view all interactions for the selected staff; view staff work queue; view a time recap of billable, nonbillable, and administrative time totals. A Staff In/Out Availability portlet allows users to enter their individual availability (or supervisors to enter availability of subordinates). In this manner other professionals or staff members can easily determine availability. A security setup function allows users to set up multi-level security in PMS areas to meet firm-specific needs. Specific security groups such as staff, managers, partners, or any designation may be established and maintained. This security feature enables control over the level and type of information available to staff, including what they can view on dashboards.

The SWM may include functionality to port, import or export, information and data to other applications or databases. For example, a Scheduling/Calendar Portlet may be provided that ports scheduling information directly into MS Outlook Calendar for viewing or response by users. For instance, if a manager schedules a staff member for a project, the staff member may "accept", "accept with comment," or "decline" an "invitation" to the project. The staff members response may then be processed within Outlook and provided back to the SWM for further processing within the scheduling function. Also, the dashboard may show benefits information related to the particular user or manager. For instance, the dashboard may show balances, e.g., beginning, earned, used, for the different types of benefits the staff member is eligible for. Likewise, a CE Status representation may be included. For instance, a portlet may give the staff member an overview of their status relating to CE requirements, and training, and it may show them information such as the Boards they belong to, category, CE credits earned, CE credits needed and the renewal date. In addition, the system may show staff members courses that are offered and available to them in their area by using information provided by external resources, including web-based systems, e.g., Reqwired, Inc., PPC, PeopleTrack. Likewise, the SWM may integrate with external scheduling applications and databases, e.g., ProStaff Resource Scheduling Software by Taylor Made Software, Inc. In addition, the SWM may allow for user customization. For example, allow a user to define the allowed benefits available to staff members, e.g., individually or by class of staff. The SWM may be provided initially with a set of predefined benefits or allow enabling, disabling or selection of benefits. Also, automatic rollover or calculation of benefits may be provided as well as a mechanism to prevent time entry to benefits where not available or when a staff member's balance is zero. Also, a user may specify a benefits year or period as being different than a firm operating year.

With reference to FIG. 37, the invention may include Staff Workflow and Management dashboard schedule portlets. Staff Dashboard Schedule portlet shows all of the items assigned to an individual, or manager, in a day layout. It may pull Outlook items and PCS schedule items. Items that go past complete/due may be shown in red. With reference to FIG. 38, Schedule Items portlet may show items that are assigned to an individual or manager and clicking a button, e.g., 'Assign Next in Work Queue', automatically assigns work to the logged in user based on Staff Qualifications, Start Date and Priority. With reference to FIG. 39. a Work Queue portlet shows items that the individual is qualified to work on but has not yet been assigned to him. The user may select an item and then click on the 'Assigned Selected to Me' button to have the system assign it to him. With reference to FIG. 40, Scheduled Benefit Requests allows a staff member to enter a benefit request and it is electronically routed to the Supervisor's dashboard, the supervisor then opens the request and approves/denies the request. The staff making the request is then notified via a pop up message showing them whether the request was accepted or denied.

Figure 41:
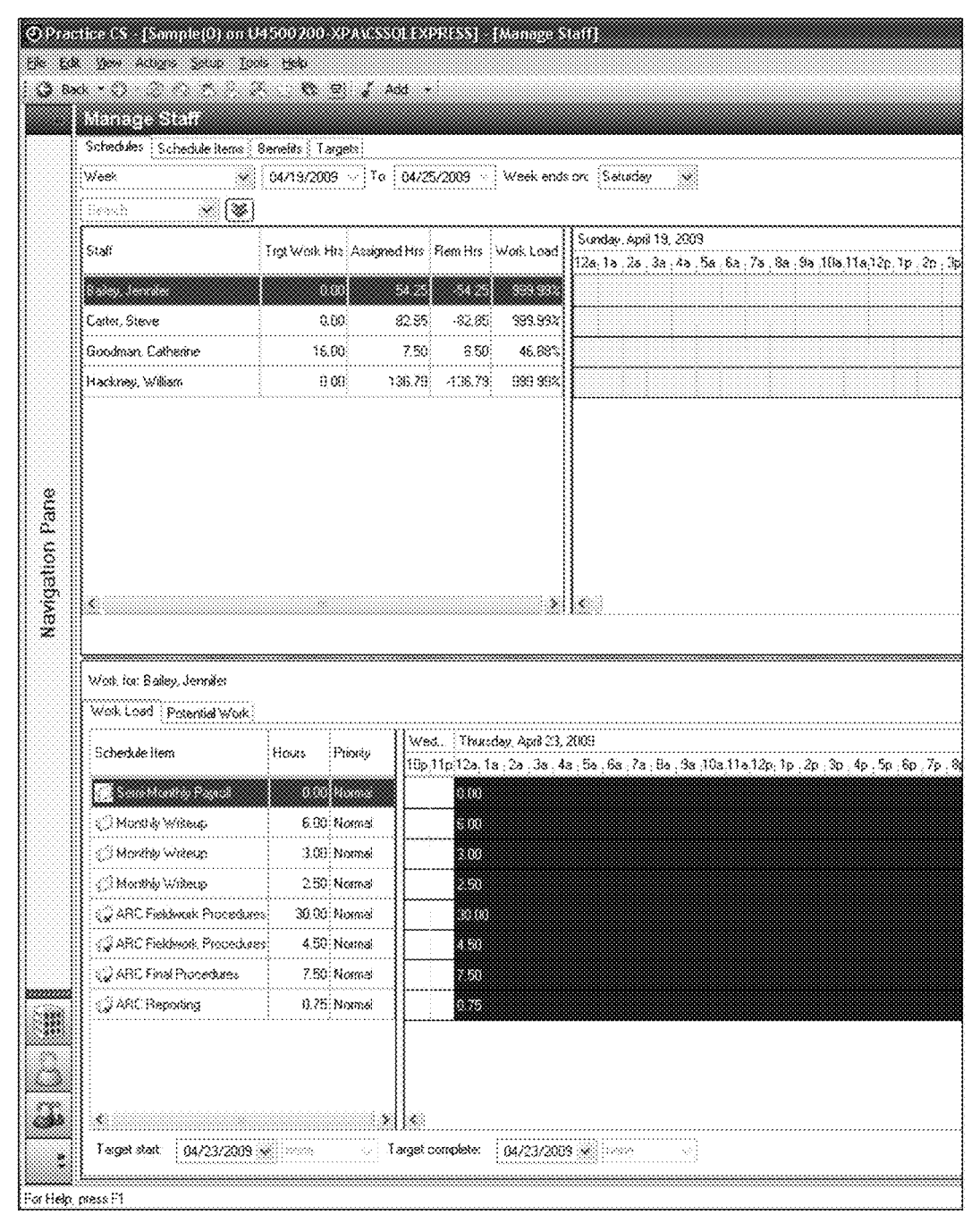
Figures 42, 43:
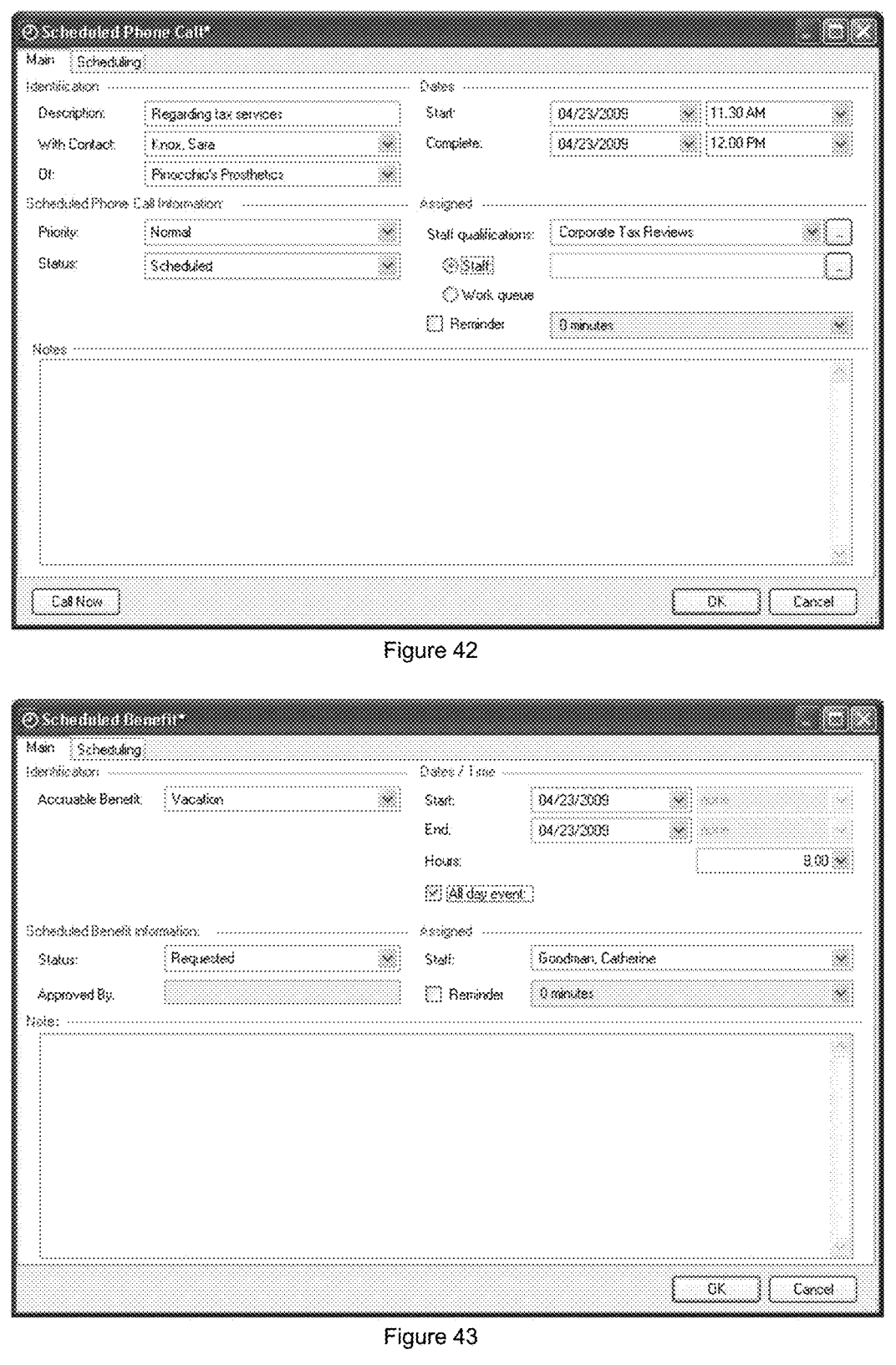
Figure 44:
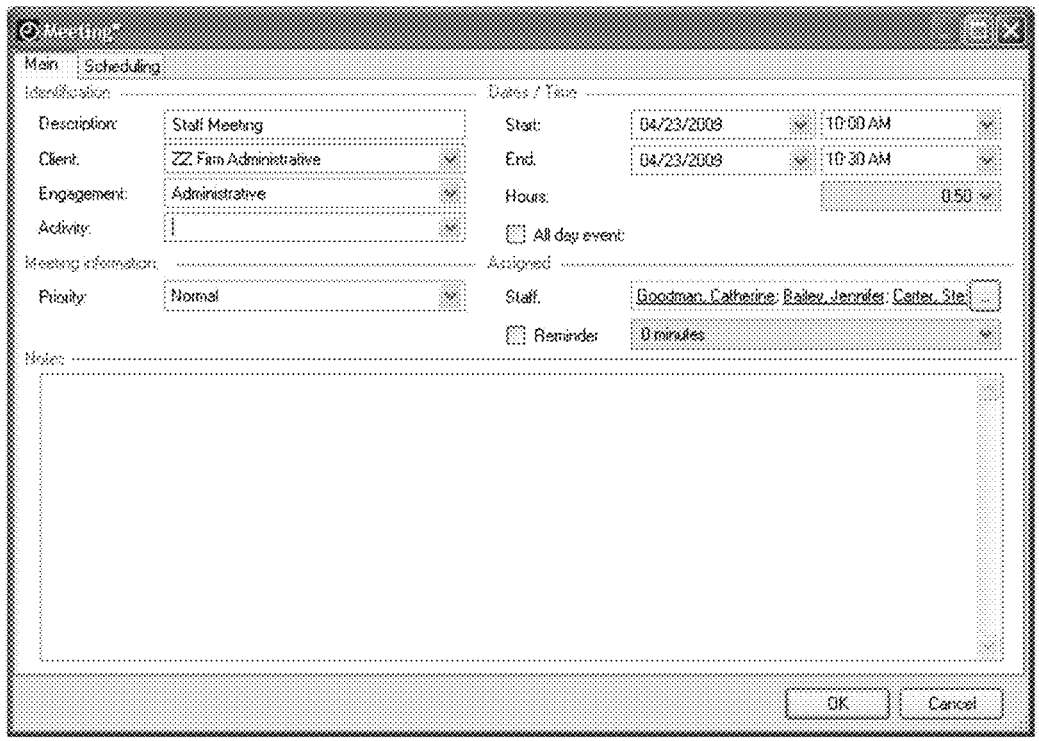
Figure 45:
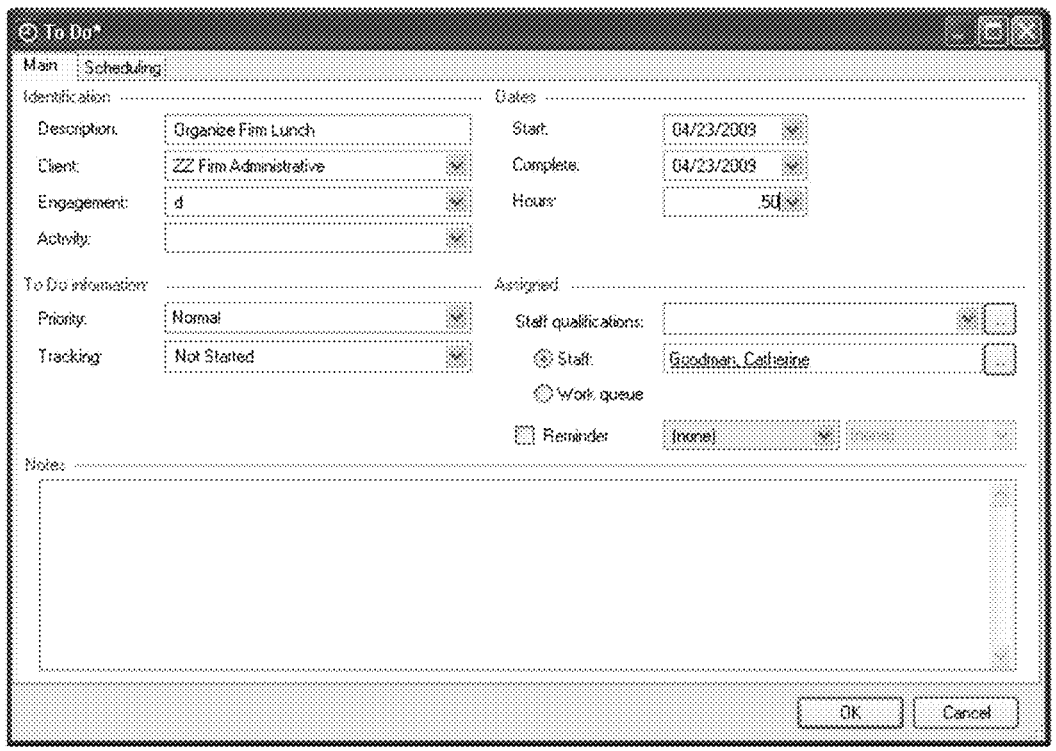
Figure 46:
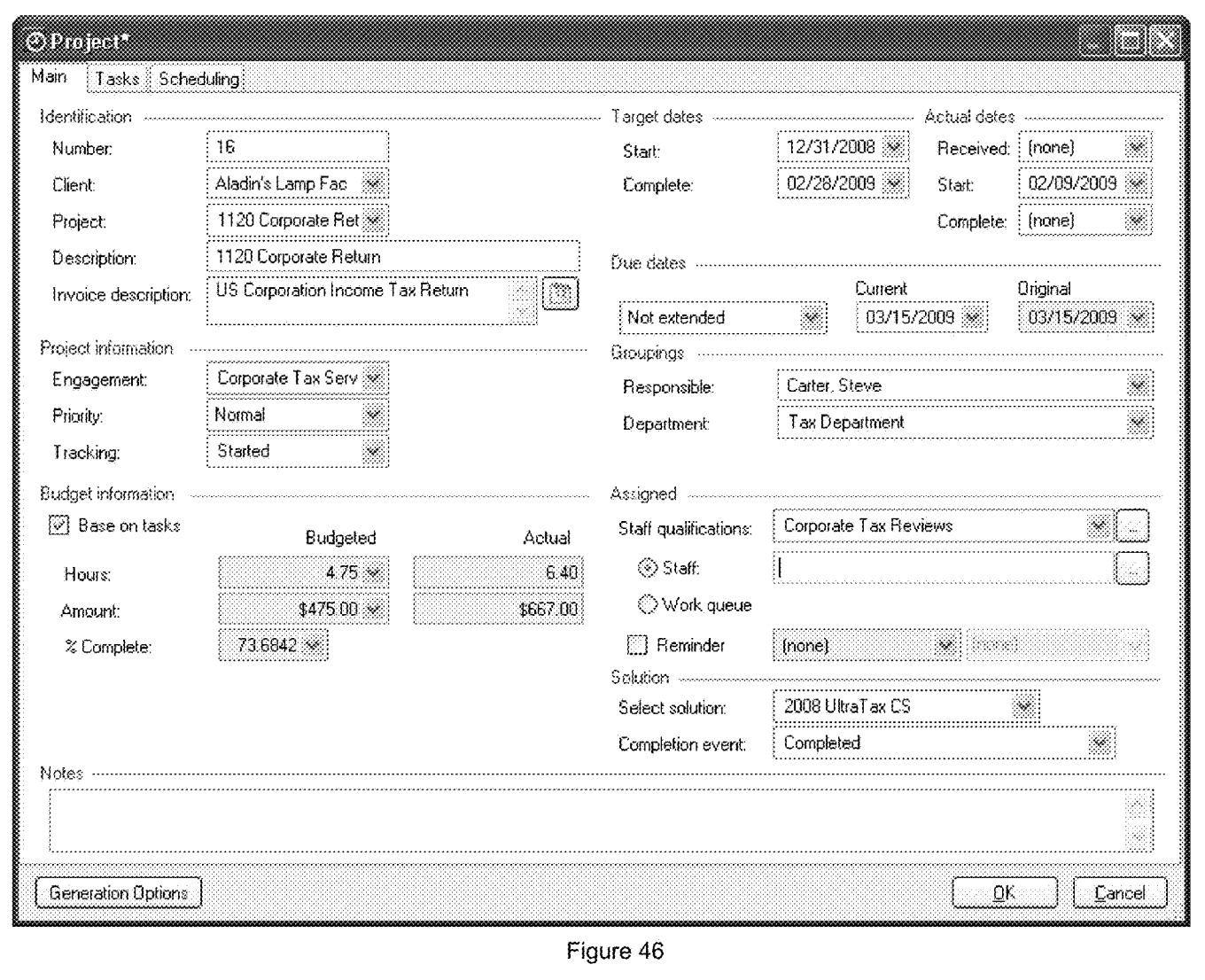
Figure 47:
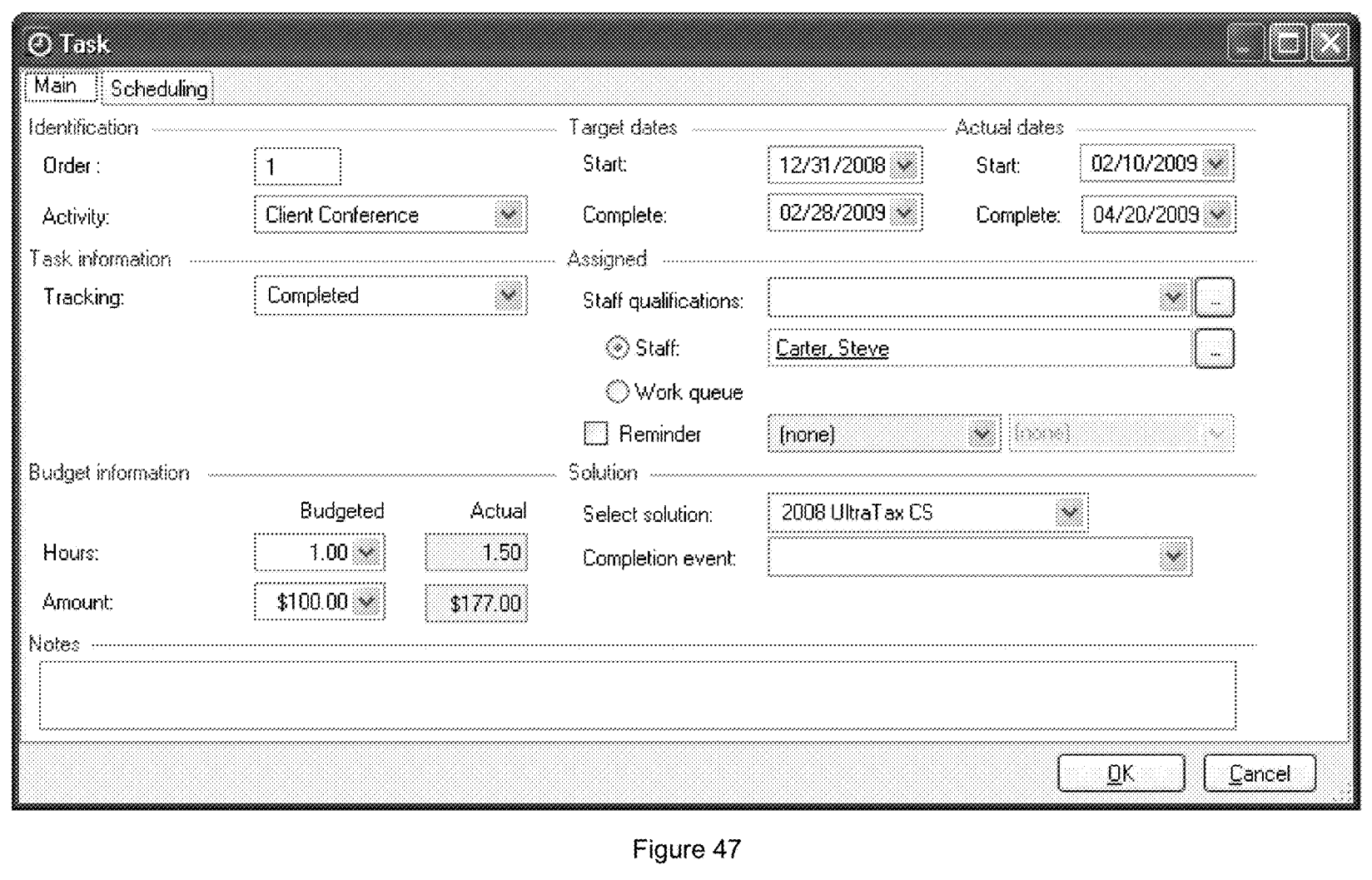

With reference to FIG. 41, "Manage Staff|Schedules" tab opens a screen that displays all of the staff and their schedules for the date range specified at the top of the screen. When a staff is selected at the top, we are displaying schedule items for them in two ways in the lower portion of the screen. The 'Work Load' tab shows items that are currently assigned to the selected staff for the date range selected and the 'Potential Work' shows all of the items that the selected staff is qualified to work on but is not yet assigned to them. The user may manually select items from this tab to assign to the staff or alternatively an automated scheduling function may be performed. 'Pool' terminology—is a group of items ready to be worked on but not assigned to anyone a 'Pool'. This may also be referred to as a 'Work Queue'. Schedule Items—relates to how staff qualifications may be set. Note the 'Assigned' section. Staff Qualifications may be set or based on a filter on staff properties but may also specify various other criteria such as most experience for the type of work, realization for the type of work, most learning/CE hours in the type of work, etc. Once the Staff Qualifications are set, the user may select 'Staff' to select a specific person to work on the item or 'Work Queue' to make the item available to anyone that is meets the qualifications and to implement a desired workflow process. Exemplary GUIs are shown in FIGS. 42-47 that relate to: Scheduled Phone Call (FIG. 42); Schedule Benefit (FIG. 43); Meeting (FIG. 44); To Do (FIG. 45); Project (FIG. 46); and Workflow or Task (FIG. 47).

An additional aspect of the invention is 'Pushing'. 'Pushing' occurs when a Schedule (or Workflow) Item goes past it's Complete/Due Date and it is not set as completed. A Schedule Item shows up in portlets, calendars and other scheduling displays (such as Manage Staff|Schedules/Schedule Items) when all or a portion of it's Start date to Complete date range is in the range being displayed. If the item is not completed and 'today' is past the Schedule Item's complete date, then it is 'pushed' to today. Any time the current system date is displayed in portlets, calendars and schedule displays, it will include all schedule items where all or a portion of their start date to complete date is in the displayed range and all schedule items where the complete date is less that the system date and the item is not completed. The concept is intended to show how work is piling up and to help management load balance between busy and free staff FIG. 48 illustrates an exemplary screen shot in which the PMS reports future benefit accruals and 'To Use' calculations. In this manner, the Practice Management system may provide benefit tracking and may further perform calculated accruals as well as future accrual projections and reporting the number of hours that need to be used before time is lost due to firm carryover rules. As shown in FIG. 49, this information may be displayed in "Staff Management-|Benefits" tab and as a portlet on the Staff Dashboard.

Figure 50:

With reference to FIG. 50, an exemplary Manage Staff screen shot is shown illustrating the functionality of the "Schedules" tab, which relates to the scheduling aspect of the present invention and enables firms to assign and manage staff based on various data, including skill areas of expertise, skill or other performance ratings, skill sets, and real-time availability.

Figure 51:
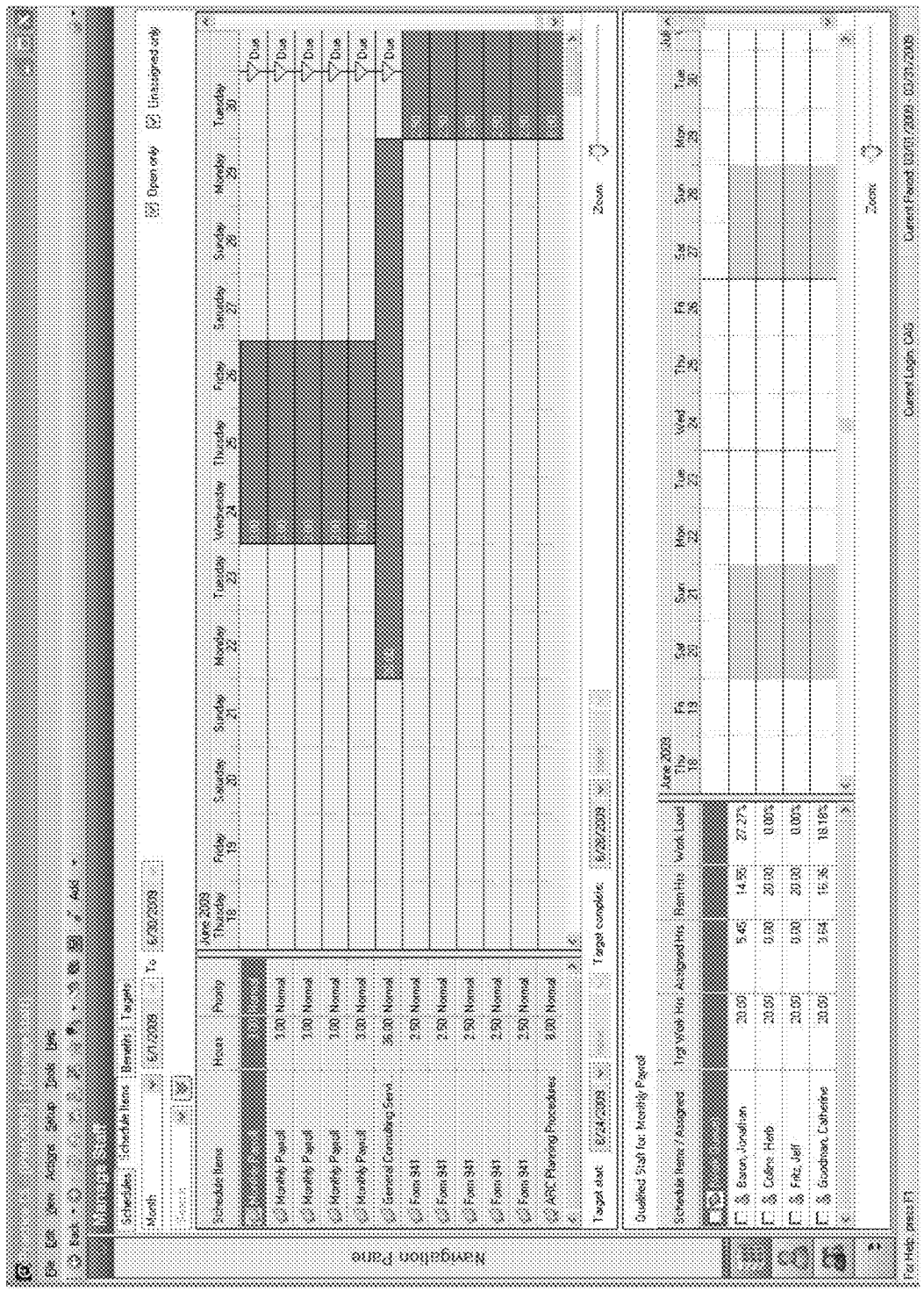

With reference to FIG. 51, an exemplary Manage Staff screen shot is shown illustrating the functionality of the "Schedule Items" tab. The Manage Staff screen allows a user to review unassigned work items along with a listing of qualified staff with their current work load to enable efficient staff to project management in scheduling. In this manner the PMS simplifies scheduling and enhances staff utilization. For instance, this feature allows firms to: manage and schedule staff assignments, such as: scheduled phone calls, benefits, meetings, and to-do items. Firms licensed for Project Management and Staff Management will also benefit from project and task scheduling; define staff qualifications for schedule items and work queues. Staff can view only the items for which they are qualified, and they can request additional work from the queue; use the Schedules tab of the Manage Staff screen to view staff workloads and quickly re-assign schedule items for overbooked staff or assign schedule items to staff that have capacity, view items that have not yet been assigned, and identify items that are behind schedule; enable staff to view their schedules, workloads and items in the work queue by using the Schedule, Schedule Items, and Work Queue portlets on the Staff Dashboard; and set reminders for all schedule items, including projects and task using the Project Management and Staff Management modules.

Figure 52:
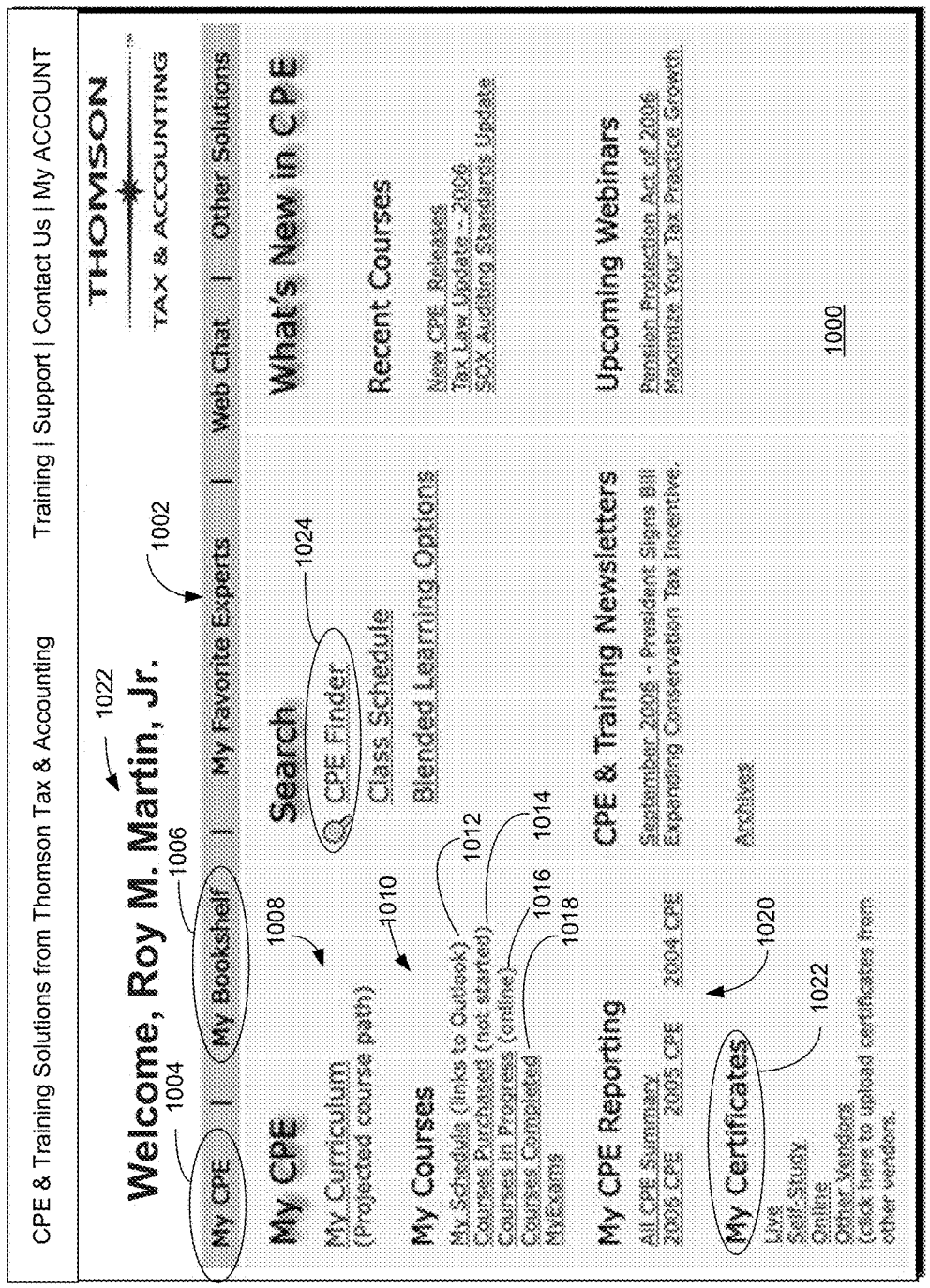

As part of the Staff Workflow and Management functionality, the PMS may include a Continuing Education dashboard (CE). With reference to FIG. 52, a personalized education portal or webpage 1000 is associated with an individual user account, in this example for an individual named Roy Martin. The portal acts as a "one-stop" personalized navigator that presents user information and enables easy navigation to education and training related events and services as well as navigation to other areas. The "My CPE" homepage 1000 is presented upon login on the system or upon linking to the webpage via a professional resource application adapted to automatically, such as by way of an SSO process, enable access to this education services system and associated user interface. The personalized user interface screen 1000 includes tabs 1002, including My CPE 1004 and My Bookshelf 1006. The screen displays personalized content and links such as for My Curriculum 1008, My Courses 1010, My CPE Reporting 1020, and My Certificates 1022. User interface screen 1000 also displays Search functionality, including CPEFINDER 1024, CPE and training newsletters, and new CPE and training related offerings. Associated with My Courses 101 is My Schedule 1012, Courses Purchased (not started), Courses in Progress (online), Courses complete, and MyExams. My CPE Reporting 1020 in whole or in part automates the reporting process. After completion of a CPE course, the system includes processes to implement reporting of the course to jurisdictions associated with the individual completing the course. The database includes user profiles and has associated with each individual that person's bar number or board number or other assigned number to facilitate both reporting of the course for credit to that individual to the one or more jurisdictions. Likewise, the system can confirm electronically that the jurisdiction has credited the individual with the CPE, CLE or other such credits, update the user profile and database to reflect the credit awarded, and present the information to the user via the dashboard 1000, aspects of which may be included in the user homepage in the form of an additional CE portal.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A system for determining staffing decisions in providing professional services, the system comprising:
 a. a network server having a processor and a non-transitory memory comprising instructions executed by the processor;
 b. at least one central database in electrical communication with the network server and comprising a set of tables, the set of tables comprising:
  i) a staffing table comprising a set of work related data concerning a set of individuals involved in delivery of professional services, the set of work related data comprising skill data, availability data, and client data; and
  ii) an engagement table comprising a set of tasks, including a first project task comprising a predefined set of task criteria including skills criteria required to accomplish the task;
 c. the network server having an input/output in electrical communication over at least one communications network with a remote server associated with an education services provider and a plurality of client systems, the network server further adapted to automatically generate for display at an associated user machine a user dashboard customized based on information related to a user account associated with the user machine and comprising a personalized learning portal derived in part from information from the education services provider;
 d. a workflow module comprising:
  i) a workflow tracking routine when executed by the network server adapted to automatically track the work related data, other than availability data, for the set of individuals and to automatically update in real time the work related data in the staffing table based on updated information received from the plurality of client systems and the education services provider server;
  ii) a workflow task routine when executed by the network server adapted to receive, from one of the plurality of client systems, a task input related to the first project task and including data for identifying and assigning one or more individuals to work on the first project task, and to update the first project task stored in the engagement table based on the received task input;
  iii) a workflow skill match routine when executed by the network server adapted to compare the skills criteria related to the first project task to skill data in the staffing table and match skill data associated with a first individual from the set of individuals from the staffing table with skills criteria associated with the first project task, the skill data including a grading of the first individual maintained in real time to reflect work related changes to the first individual skill data, and based on the match assign the first individual to work on the first project task and update the staffing and engagement tables;
  iv) a work schedule routine when executed by the network server adapted to automatically determine a work schedule for the first individual assigned to the first project task, the work schedule being determined based at least in part on availability of the first individual and a set of predefined individual work related attributes retrieved from the associated work related data in the staffing table;
e. a management interface when executed by the network server adapted to generate a set of user interface elements and present the set of user interface elements to a connected one of the plurality of client systems, the management interface providing a user involved with managing staff assignments with a user interface for modifying the automatically determined work schedule for the set of individuals including the first individual and based on modifications to the automatically determined work schedule for the set of individuals updating corresponding entries in the staffing table and engagement table; and
f. an electronic mail interface adapted to automatically generate a notification and to format the notification based on a known electronic mail system associated with one or more of the plurality of client systems for delivery of the notification to one or more of the set of individuals, including the first individual, the notification representing respective assignments related to the determined work schedule as modified.

2. The system of claim 1, wherein work related data includes work schedule data, and the system further comprising automatically updating an individual's work schedule data to reflect a task assigned in the assigning step.

3. The system of claim 1, wherein work related data includes time and billing data, and the system further comprising receiving an input related to entry of time and billing data and automatically updating the work related data to reflect the received input.

4. The system of claim 1 wherein the workflow task routine is related to assigning an individual work or education.

5. The system of claim 1, wherein the workflow task routine is based at least in part on skill data associated with an individual.

6. The system of claim 1, wherein the workflow task routine is based at least in part on client data associated with an individual.

7. The system of claim 1 further comprising wherein:
a. the workflow task routine is further adapted to receive a request for professional services;
b. the workflow skill match routine is further adapted to, based at least in part on the work related data, recommend a set of individuals from the plurality of individuals to satisfy the request for professional services.

8. The system of claim 7 further comprising wherein:
a. the workflow skill match routine is further adapted to determine whether one or more of the recommended set of individuals is available to satisfy the request for professional services.

9. The system of claim 7 further comprising wherein the workflow skill match routine is further adapted to compare the skills criteria related to the first project task to skill data in the staffing table and match skill data associated with a second individual from the set of individuals from the staffing table with skills criteria associated with the first project task, the skill data including a grading of the second individual maintained in real time to reflect work related changes to the second individual skill data and based on the match assign the second individual to work on the first project task and update the staffing and engagement tables.

10. The system of claim 1 wherein the work related data includes one or more of a peer review component, availability, billing rate, experience, seniority, industry experience, worker qualifications, worker evaluations, skill development criteria, client history, distribution of workload, and location of work.

11. The system of claim 10 wherein the peer review component includes evaluation data concerning one or more of quality of work, efficiency, expertise, experience, feedback, results, outside evaluations, and internal evaluations.

12. The system of claim 11 further comprising wherein the workflow skill match routine is further adapted to assign the first individual a task related to continuing education based at least in part on the peer review component.

13. A computer-based system for determining staffing decisions in providing professional services, the system comprising:
a network server having a processor and a non-transitory memory adapted to store instructions for execution by the processor;
a database in electrical communication with the network server and comprising a set of tables, the set of tables comprising:
a staffing table comprising a set of work related data concerning a set of individuals involved in delivery of professional services, the set of work related data comprising skill data, availability data, and client data; and
an engagement table comprising a set of tasks, including a first project task comprising a predefined set of task criteria including skills criteria required to accomplish the task;
the network server having an input/output in electrical communication over at least one communications network with a remote server associated with an education services provider and a plurality of client systems, the network server further adapted to automatically generate for display at an associated user machine a user dashboard customized based on information related to a user account associated with the user machine and comprising a personalized learning portal derived in part from information from the education services provider;
a practice workflow and management module for processing a set of work related data when executed by the processor, and adapted to:
a. automatically track, by the practice and workflow management module of the system, the work related data, other than availability data, for the set of individuals and to automatically update in real time the work related data in the staffing table based on updated information received from the plurality of client systems and the education services provider;
b. receive from one of the plurality of client systems, by the practice and workflow management module of the system, a task input related to the first project task and including data for identifying and assigning one or more individuals to work on the first project task and to update the first project task stored in the engagement table based on the received task input;
c. compare, by the practice and workflow management module of the system, the skills criteria related to the first project task to skill data in the staffing table and match skill data associated with a first individual from the set of individuals from the staffing table with skills criteria associated with the first project task, the skill data including a grading of the first individual maintained in real time to reflect work related changes to the first individual skill data and based on the match assign the first individual to work on the first project task and update the staffing and engagement tables;

d. automatically determine, by the practice and workflow management module of the system, a work schedule for the first individual assigned to the first project task, the work schedule being determined based at least in part on availability of the first individual and a set of predefined individual work related attributes retrieved from the associated work related data in the staffing table;

e. generate, by a staff and workflow management module of the system, a management interface comprising a set of user interface elements and present the set of user interface elements to a connected one of the plurality of client systems, the management interface providing a user involved with managing staff assignments with a user interface for modifying the automatically determined work schedule for the set of individuals including the first individual and based on modifications to the automatically determined work schedule for the set of individuals updating corresponding entries in the staffing table and engagement table; and f. automatically generate, by an electronic mail interface, a notification and to format the notification based on a known electronic mail system associated with one or more of the plurality of client systems for delivery of the notification to one or more of the set of individuals, including the first individual, the notification representing respective assignments related to the determined work schedule as modified.

14. The system of claim 13, wherein work related data includes work schedule data, and the practice workflow and management software is further adapted to automatically update an individual's work schedule data to reflect a task assigned.

15. The system of claim 13, wherein work related data includes time and billing data, and the practice workflow and management software is further adapted to receive an input related to entry of time and billing data and automatically update the work related data to reflect the received input.

16. The system of claim 13, wherein the first project task assigned is related to assigning an individual work or education.

17. The system of claim 13, wherein the first project task is assigned based at least in part on the skill data associated with the first individual.

18. The system of claim 13, wherein the first project task is assigned based at least in part on client data associated with the first individual.

19. The system of claim 13, wherein the practice workflow and management module is further adapted to recommend a subset of individuals from the set of individuals to satisfy a request for professional services, based at least in part on the work related data.

20. The system of claim 19, wherein the practice workflow and management module is further adapted to determine whether one or more of the recommended subset of individuals is available to satisfy the request for professional services.

21. The system of claim 19, wherein the practice workflow and management module is further adapted to staff a work function based on the recommendation with at least some of the recommended subset of individuals.

22. The system of claim 13, wherein the work related data includes one or more of a peer review component, availability, billing rate, experience, seniority, industry experience, worker qualifications, worker evaluations, skill development criteria, client history, distribution of workload, and location of work.

23. The system of claim 22, wherein the peer review component includes evaluation data concerning one or more of quality of work, efficiency, expertise, experience, feedback, results, outside evaluations, and internal evaluations.

24. The system of claim 23, wherein the practice workflow and management module is further adapted to assign the first individual a task related to continuing education based at least in part on the peer review component.

* * * * *